US012369115B2

(12) United States Patent
Patil et al.

(10) Patent No.: US 12,369,115 B2
(45) Date of Patent: Jul. 22, 2025

(54) STANDALONE AND SUPPLEMENTAL SPECTRUM OPERATIONS

(71) Applicant: QUALCOMM Incorporated, San Diego, CA (US)

(72) Inventors: Abhishek Pramod Patil, San Diego, CA (US); Abdel Karim Ajami, San Diego, CA (US); Gaurang Naik, San Diego, CA (US); Sai Yiu Duncan Ho, San Diego, CA (US); Yanjun Sun, San Diego, CA (US); George Cherian, San Diego, CA (US); Alfred Asterjadhi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 467 days.

(21) Appl. No.: 17/649,555

(22) Filed: Jan. 31, 2022

(65) Prior Publication Data

US 2023/0247549 A1 Aug. 3, 2023

(51) Int. Cl.
*H04W 52/02* (2009.01)
*H04W 8/00* (2009.01)
*H04W 72/566* (2023.01)

(52) U.S. Cl.
CPC ....... *H04W 52/0216* (2013.01); *H04W 8/005* (2013.01); *H04W 72/569* (2023.01)

(58) Field of Classification Search
CPC .............. H04W 52/0216; H04W 8/005; H04W 72/569; H04W 84/12; H04W 48/16
See application file for complete search history.

(56) References Cited

U.S. PATENT DOCUMENTS

| 2012/0026997 | A1 | 2/2012 | Seok et al. | |
| 2013/0111044 | A1* | 5/2013 | Cherian | H04L 65/1066 709/228 |
| 2014/0241226 | A1* | 8/2014 | Jia | H04W 48/14 370/311 |
| 2015/0282064 | A1* | 10/2015 | Patil | H04W 48/20 370/329 |
| 2016/0142856 | A1* | 5/2016 | Worrall | H04W 4/021 455/456.3 |
| 2018/0152860 | A1 | 5/2018 | Huang et al. | |
| 2018/0167822 | A1* | 6/2018 | Cordeiro | H04W 4/02 |

(Continued)

FOREIGN PATENT DOCUMENTS

| CN | 112737718 A | * | 4/2021 | ........... H04B 17/382 |
| WO | 2021162945 A1 | | 8/2021 | |

OTHER PUBLICATIONS

International Search Report and Written Opinion—PCT/US2023/060965—ISA/EPO—Apr. 11, 2023.

*Primary Examiner* — Dinh Nguyen
(74) *Attorney, Agent, or Firm* — ArentFox Schiff LLP

(57) ABSTRACT

This disclosure provides methods, devices and systems for transmitting and receiving, between an access point (AP) and one or more stations (STAs) in a basic service set (BSS), within a 3.5 GHz bandwidth. In some examples, the AP may generate a first advertisement frame comprising information configured to enable one or more communication devices to associate with the apparatus for wireless communications via a first channel in a first operating band. In some examples, the AP may output the first advertisement frame for transmission according to a first periodic interval.

34 Claims, 9 Drawing Sheets

(56) References Cited

U.S. PATENT DOCUMENTS

| | | | |
|---|---|---|---|
| 2019/0037595 A1* | 1/2019 | Cherian | H04W 74/006 |
| 2019/0098565 A1 | 3/2019 | Cherian et al. | |
| 2020/0068486 A1 | 2/2020 | Asterjadhi et al. | |
| 2020/0112910 A1* | 4/2020 | Cherian | H04W 72/0446 |
| 2020/0213933 A1 | 7/2020 | Patil et al. | |
| 2020/0260488 A1* | 8/2020 | Cherian | H04W 56/001 |

* cited by examiner

STANDALONE AND SUPPLEMENTAL SPECTRUM OPERATIONS

TECHNICAL FIELD

This disclosure relates generally to wireless communication, and more specifically, to use of different spectrums in standalone and supplemental scenarios.

DESCRIPTION OF THE RELATED TECHNOLOGY

Radio frequency (RF) spectrum is the foundation for many wireless communications systems in use today, including wireless local area network (WLAN), radar, and cellular communications systems. Specified frequency ranges, sometimes identified as bands or channels, in the RF spectrum may be allocated for use by different entities, for different purposes, or in different geographic locations. As used in this disclosure, "spectrum" refers to any frequencies, frequency bands, and frequency channels in the RF spectrum that may be used or allocated for wireless communications.

Because the available RF spectrum is finite, frequency allocations in the spectrum are highly valued and often highly regulated. In the United States, for example, the Federal Communications Commission (FCC) and the National Telecommunication and Information Administration (NTIA) regulate and manage spectrum allocations, allotments, and assignments. Frequency allocation is the process by which the entire RF spectrum is divided into frequency bands established for particular types of service. These frequency allocations are then further subdivided into channels designated for a particular service or "allotment." Assignment refers to the final subdivision of the spectrum in which a party gets one or more frequency assignments, in the form of a license, to operate a radio transmitter on specific frequencies within a particular geographic location.

The system of spectrum allocation, allotment, and assignment is failing to keep pace with the increasing demand for spectrum. There is therefore a need to improve how the available spectrum and future spectrum can be efficiently allocated and used in the face of growing demand. Unless otherwise noted, "allocation" is used in the present disclosure to generally refer to the process by which spectrum is allocated, allotted, and assigned to licensed users.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Certain aspects are directed to an apparatus for wireless communications. In some examples, the apparatus includes a memory comprising instructions and one or more processors configured to execute the instructions. In some examples, the one or more processors are configured to cause the apparatus to generate a first advertisement frame comprising information configured to enable one or more communication devices to associate with the apparatus for wireless communications via a first channel in a first operating band. In some examples, the one or more processors are configured to cause the apparatus to output the first advertisement frame for transmission according to a first periodic interval.

Certain aspects are directed to an apparatus for wireless communications. In some examples, the apparatus includes a memory comprising instructions and one or more processors configured to execute the instructions. In some examples, the one or more processors are configured to cause the apparatus to obtain, from an access point (AP), a first advertisement frame comprising information configured to enable the apparatus to associate with the AP for wireless communications via a first channel in a first operating band. In some examples, the one or more processors are configured to cause the apparatus to output an association request frame for transmission to the AP via the first channel.

Certain aspects are directed to a method for wireless communications by an access point (AP). In some examples, the method includes generating a first advertisement frame comprising information configured to enable one or more communication devices to associate with the AP for wireless communications via a first channel in a first operating band. In some examples, the method includes outputting the first advertisement frame for transmission according to a first periodic interval.

Certain aspects are directed to a method for wireless communications by a station (STA). In some examples, the method includes obtaining, from an access point (AP), a first advertisement frame comprising information configured to enable the STA to associate with the AP for wireless communications via a first channel in a first operating band. In some examples, the method includes outputting an association request frame for transmission to the AP via the first channel.

Certain aspects are directed to an apparatus for wireless communications. In some examples, the apparatus includes means for generating a first advertisement frame comprising information configured to enable one or more communication devices to associate with the apparatus for wireless communications via a first channel in a first operating band. In some examples, the apparatus includes means for outputting the first advertisement frame for transmission according to a first periodic interval.

Certain aspects are directed to an apparatus for wireless communications. In some examples, the apparatus includes means for obtaining, from an access point (AP), a first advertisement frame comprising information configured to enable the apparatus to associate with the AP for wireless communications via a first channel in a first operating band. In some examples, the apparatus includes means for outputting an association request frame for transmission to the AP via the first channel.

Certain aspects are directed to a non-transitory computer-readable medium having instructions stored thereon that, when executed by an access point (AP), cause the AP to perform operations comprising generating a first advertisement frame comprising information configured to enable one or more communication devices to associate with the AP for wireless communications via a first channel in a first operating band. In some examples, the operations include outputting the first advertisement frame for transmission according to a first periodic interval.

Certain aspects are directed to a non-transitory computer-readable medium having instructions stored thereon that, when executed by a station (STA), cause the STA to perform operations comprising obtaining, from an access point (AP), a first advertisement frame comprising information configured to enable the STA to associate with the AP for wireless communications via a first channel in a first operating band. In some examples, the operations include outputting an association request frame for transmission to the AP via the first channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
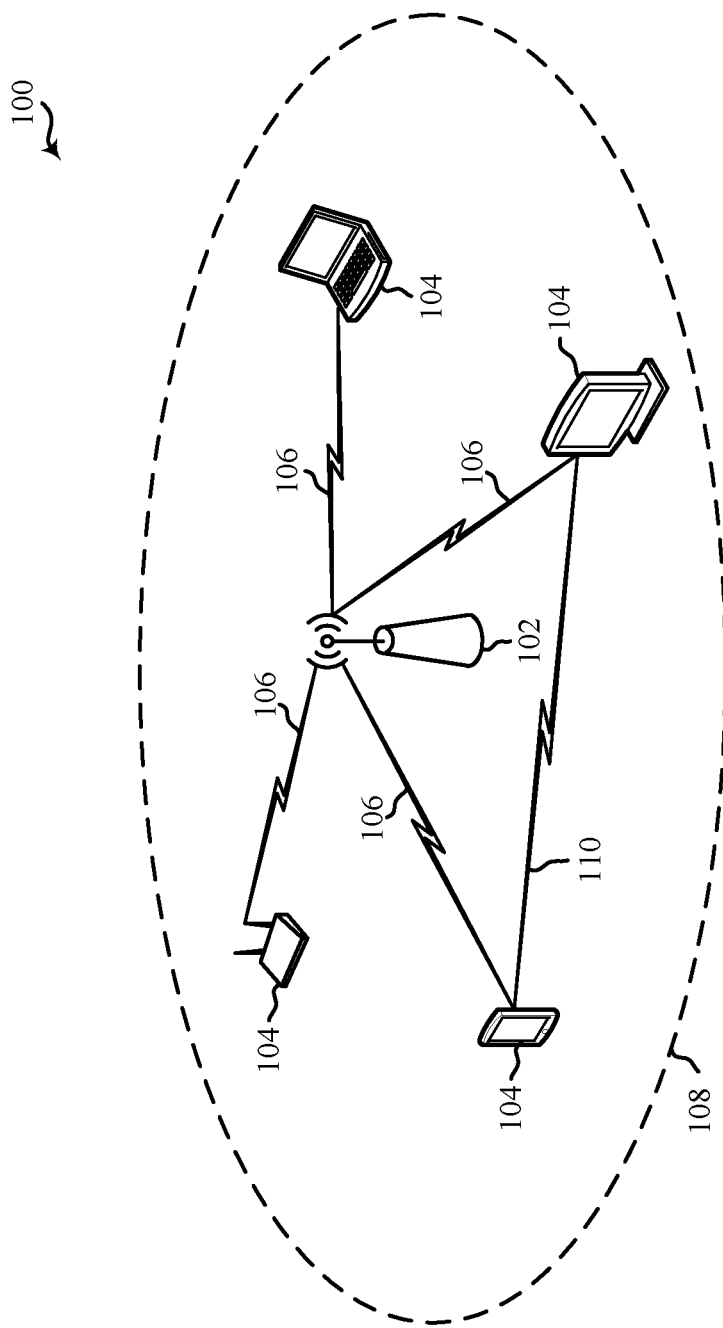
FIG. 1 is a pictorial diagram illustrating an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the $3^{rd}$ Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU)-MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network. As used herein, the term "communicating" or "communication" may relate to wireless communication (e.g., transmission and/or reception of data and/or control channels) on one or more operational bands.

As noted, the available RF spectrum is finite, and frequency allocations in the spectrum are highly valued and often highly regulated. However, in keeping the pace with increasing demand for spectrum, other bands may be added to the usable spectrum. For example, the WiFi spectrum currently includes a 2.4 GHz, 5 GHz, 6 GHz, 60 GHz, and 900 MHz operational bands, and new operational bands, such as a 3.5 GHz operational band, may be added to the spectrum in the future. In an effort to regulate and manage new operational bands, regulatory rules may be put into place specifying that the new operational bands, or a portion thereof, may be owned or leased by an operator at a given location for a period of time (e.g., minutes, hours, days, months, years, etc.). Certain aspects are directed to at least two modes of operation to be used with a new operational band. One mode relates to a standalone operational mode, and the other relates to a supplemental operational mode. Although the examples described herein are directed towards 3.5 GHz, the same examples may apply with equal force to any new operational band or portion of the spectrum that would be made available to Wi-Fi in the future.

The standalone mode of operation relates a mode of communication between an access point (AP) and a station (STA), wherein the AP is a standalone AP, meaning that the AP only operates on the new operational band and does not operate on legacy operational bands. Such standalone APs may experience problems with the number of STAs that are capable of associating with the AP. For example, because the AP only operates on the new operational band, there may be relatively few devices or STAs that are configured to operate on the new band. Moreover, even if there are STAs capable of using the new operational band, those devices may not even scan the spectrum for the new operational band because legacy bands are much more prolific. Thus, certain problems may arise with how an STA can discover a standalone AP operating on the new operational band, and how the STA associates with the standalone AP.

In one example, an STA may be configured to discover a standalone AP operating in a new operational band. For example, prior to discovery, the STA may be provisioned with credentials (e.g., security codes, expected SSID of the standalone AP, etc.) to enable wireless communication via one or more channels of the new operating band. For example, the STA may be manufactured with the capability to communicate over the new operational band, or the STA may be configured "out-of-band" for the new operational band (e.g., the STA may be configured by an enterprise or user prior to association with the new operational band). Thus, the STA may be configured to associate with the standalone AP prior to association with the AP (e.g., pre-configuration of the STA), and/or configured at least in part by the standalone AP after association with the AP. In some examples, the AP may dynamically configure the STA for communication over the new operational band after association (e.g., provide the STA with network updates, timing information, etc.).

In some examples, the STA may be configured with a particular location (e.g., global positioning system (GPS) coordinates, etc.) associated with a standalone AP. In such an example, when the STA determines that it is within the particular location, then the STA may scan the new operational band to find and associate with the standalone AP.

In another example, the standalone AP may reduce wireless communication overhead by increasing an offset time between transmission of management frames (e.g., a beacon frame, etc.). For example, an AP may typically transmit a beacon frame every 100 ms, but beacon frames convey a lot of information and require a significant amount of time and frequency resources to be transmitted. Thus, in some examples, the standalone AP may transmit beacon frames less frequently. However, in order to convey enough information to allow an STA to associate with the AP, the standalone AP may periodically broadcast a frame that requires less time and frequency resources than the beacon frame (e.g., a short frame). In one example, the short frame may be an unsolicited broadcast probe response (UBPR) fame. In another example, the short frame may be one or more of a traffic indicator map (TIM) frame, a fast initial link setup (FILS) discovery (FD) frame. Because the short frame carries less information relative to the beacon frame and requires less time and frequency resources, the short frame can be transmitted more frequently than the beacon frame without causing too great of a footprint or taking up too many resources of the new operational band.

In some examples, the AP may transmit the short frame every 20 ms. For instance, if the short frame is the UBPR frame, then the standalone AP and STA may reduce communication overhead by eliminating at least a portion of the total probe response frames that one or more STAs may transmit to the AP. Specifically, if the standalone AP transmits the UBPR periodically, then the STAs may simply wait until the next UBPR broadcast to determine whether to associate with the AP instead of first sending the AP a probe request frame, then the AP responding to each probe request frame from multiple STAs. In such an example, the AP and STA may reduce or eliminate "probe storms" wherein multiple STAs all transmit probe request frames at the same time.

In some examples, the short frame and/or beacon frame may include an indication of a target wake time (TWT) service period (SP) to provide an associated/unassociated STA with an indication of when the STA can perform certain transmissions. For example, the short frame and/or beacon frame may include a TWT SP to provide an unassociated STA with an indication of when the STA can transmit an association request frame to the AP. In another example, the short frame and/or beacon frame may include a TWT SP to provide an associated STA with an indication of when the STA can contend for communication with the AP (e.g., via enhanced distributed channel access (EDCA) based access) or an indication of when the AP will send a trigger frame to solicit an uplink from the STA. Thus, by controlling the uplink communications, the standalone AP can make communications over the new operational band more efficient.

Similarly, the standalone AP may manage access to the new operational band by disallowing or discouraging unsolicited uplink communications from STAs over the new band. For example, the AP may control the frequency and timing of certain SPs, and thus, control when an STA is able to communicate with the AP. Thus, in some examples, the AP may control STA transmissions by scheduling the STAs based on the type of traffic associated with each STA (e.g., low latency traffic, best effort traffic, unassociated, etc.). In this example, the AP may provide an STA with low latency traffic with more opportunity for uplink transmissions. The AP may also determine how frequently to allow SPs for EDCA based access.

In certain aspects, an STA may be configured to notify a standalone AP that it has data to send to the AP. In one example, an STA that is associated with the standalone AP may provide the AP with a buffer status report (BSR) via an uplink orthogonal frequency-division multiple access (OFDMA) random access (UORA) and/or a null data packet (NDP) feedback report poll (NFRP). Here, the BSR may operate as a request from the STA to the AP to trigger or schedule the STA for uplink communication to the AP. For an STA that is unassociated with the standalone AP, the STA may transmit an association request frame or probe request frame to the AP via UORA. In this way, the STA can efficiently notify the standalone AP that it has data to provide the AP.

It should be noted that in some examples, the new operational band may become unavailable to both of the AP and STAs within the APs basic service set (BSS). As explained in more detail below, an incumbent may take over the new operational band and prevent the standalone AP its BSS from using it. Thus, in order to maintain communications, the standalone AP may perform an extended channel switch announcement (ECSA) to move its BSS from the new operational band to a legacy operational band (e.g., 2.4 GHz, 5 GHz, 6 GHz, etc.). When the standalone AP is able to move back onto the new operational band, then the AP may perform another ECSA and move its BSS back.

The supplemental mode of operation relates a mode of communication between an AP and an STA, wherein the new operational band link of an AP is supplemented by another AP using a legacy band link. Thus, various implementations may relate to wireless communications over multiple communication links, and more specifically to an AP multi-link device (MLD) including a first AP associated with a first communication link in the new operational band, and one or more secondary APs associated with respective secondary communication links over legacy bands. For example, the first AP and the secondary APs may be collocated (e.g., part of the same MLD AP). Aspects of the disclosure are directed to techniques and methods of reducing communication overhead in the new operational band link by using supplemental links over legacy bands. Other aspects of the supplemental mode are directed to prioritizing the availability of the new operational band to STAs that need it most (e.g., based on the traffic profile of each STA). Other aspects of the supplemental mode are directed to scheduling access to the new operational band to make the band more efficient.

In one example, the first AP may not advertise the presence of the new operational band over the new operational band. Instead, a secondary AP may advertise its presence using a legacy band. For example, the secondary AP may transmit reduced neighbor reports (RNRs) that advertise the legacy bands as well as the new operational band. This may reduce or eliminate the amount of management frames being communicated over the new operational band.

In another example, probing (e.g., basic probing, multi-listener probing, probe request response, etc.) may not be allowed on the new operational band. In this example, a standard (e.g., IEEE standard, etc.) may expressly disallow such probing, or one or more of the first AP and secondary APs may set a bit (e.g., a do not transmit (DNT) bit) in a frame to indicate that the STAs are not permitted to transmit certain signaling over the new operational band. In this example, the MLD APs may determine when and how often to allow and disallow STA signaling over the new operational band.

In some examples, the secondary APs may advertise the new operational band as a link using signaling over a legacy band. Thus, a multi-link setup may include an indication of links available over the new operational band. In some examples, the first AP and the secondary APs may negotiate channel access rules for accessing the new operational band during or after association of an STA (e.g., frequency and duration of TWT SPs).

In certain aspects, the first AP and or secondary APs may schedule TWT SPs for UORA-based probing or EDCA-based probing by STAs. In this example, the TWT SPs may be broadcast by the secondary APs over the legacy band. The broadcast TWT SPs may be dedicated for unassociated STAs. In some examples, the broadcast TWT may include a field or a value indicating that the broadcast TWT applies to the 3.5 GHz band.

In some examples, the none of the first AP or the secondary APs may advertise or announces new operational band to an STA. Instead, the first AP (e.g., the AP operating on the new operational band) may only make the new operational band available on a need basis. In one example, the STA may provide a traffic profile to one of the APs, notifies the AP of its a priority, subscriber, QoS, etc. The AP may then determine whether to allow the client to use new operational band. For example, if the STA uses low latency communications, then the AP may invite the STA to use the new operational band. Thus, the APs may determine who to move to new operational band, when to move, and when to move them back, etc., based on the traffic characteristics. In some examples, the APs may move STAs onto the new operational band if one or more legacy bands have too many devices on them.

In certain aspects, the new operational band may be rented or leased (e.g., a priority access license (PAL), as discussed in below with regard to FIG. 3) to an enterprise or operator by a regulatory body (e.g., the Federal Communications Commission (FCC) and the National Telecommunication and Information Administration (NTIA)). For example, the regulatory body may lease the entire bandwidth, or a portion thereof, of the new operational band to an enterprise to use in a particular location. Thus, the enterprise may use the leased portion of the new operational band in the location.

In some examples, the enterprise (e.g., the lessee) may sub-lease one or more portions (e.g., time and/or frequency) of the leased operational band to other providers or users in the same location. For example, if the enterprise leases the entire new operational bandwidth, then the enterprise may sublease individual channels within the operational bandwidth to other users, or may sublease the entire new operational bandwidth to the other users. In such an example, a first user may sub-lease a first channel within the operational bandwidth, a second user may sub-lease a second channel within the operational bandwidth, etc. In some examples, the lessee and a sub-lessee may arrange to share one or more channels of the operational bandwidth according to certain rules. For example, the sub-lessee's use of the channel may be allocated to certain time windows, and/or certain durations of time. Moreover, the enterprise may sub-lease a single channel to a plurality of sub-lessee's, subject to any relevant usage restrictions. As such, multiple users may utilize individual channels (e.g., particular bandwidths) within the bandwidth at the same time and in the same location.

In one example, an enterprise may include a store that leases a portion of a new operational bandwidth. The enterprise may then divide the portion of the bandwidth into different channels, and sub-lease the individual channels to customers of the store. For example, the customers may enter the store and their devices may interface with the enterprise to arrange a sub-lease agreement. The user may pay for use of one or more channels of the operational bandwidth for an agreed upon duration of time. In some examples, the enterprise and sub-lessee can negotiate a target wake time (TWT) service period (SP) that can be exclusively used by the sub-lessee. For example, the sub-lessee may exclusively use the TWT SP for probe requests or association requests. In some examples, the enterprise may selectively provide access to users based on the traffic profile of the user. In the case of an enterprise that sub-leases multiple channels of the operating band, one or more SPs may be arranged on different channels at different times.

In certain aspects, any negotiation data/frames exchanged between the enterprise and the sub-lessee may be communicated on a non-3.5 GHz channel. Such data/frames may be configured to validate (e.g., authenticate) the enterprise as the owner/operator of the 3.5 GHz spectrum in that location. In some examples, the enterprise may provide a potential sub-lessee with a certificate signed by a trusted certificate authority (CA) (e.g., Verisign) which the potential sub-lessee may validate. In one example, the potential sub-lessee may query a spectrum access system (SAS) to confirm that the enterprise owns, leases, or otherwise carries the rights to the subject channel(s) of the sub-lease.

In some examples, the enterprise may communicate with the SAS via a backhaul link between the SAS and an enterprise owned AP, to which the SAS can provide updates on the leased portion of the operating bandwidth. For example, the SAS may inform the enterprise that it can no longer use the leased portion of the operating band because of an incumbent. In some examples, the enterprise owned AP may establish a communication link with another AP (e.g., AP2AP link) in order to facilitate signaling to revoke a lease if SAS revokes the other AP's access.

As used herein, a "legacy band" may refer to an operational band that is used by most modern electronics for wireless communication. Whereas "a new operational band" may refer to an operational band this is newly allowed for wireless communication. Thus, many wireless communication devices may not be configured to communicate over the new operational band.

FIG. 1 is a network schematic illustrating an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102 (e.g., MLD AP).

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other examples.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-channels or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2:
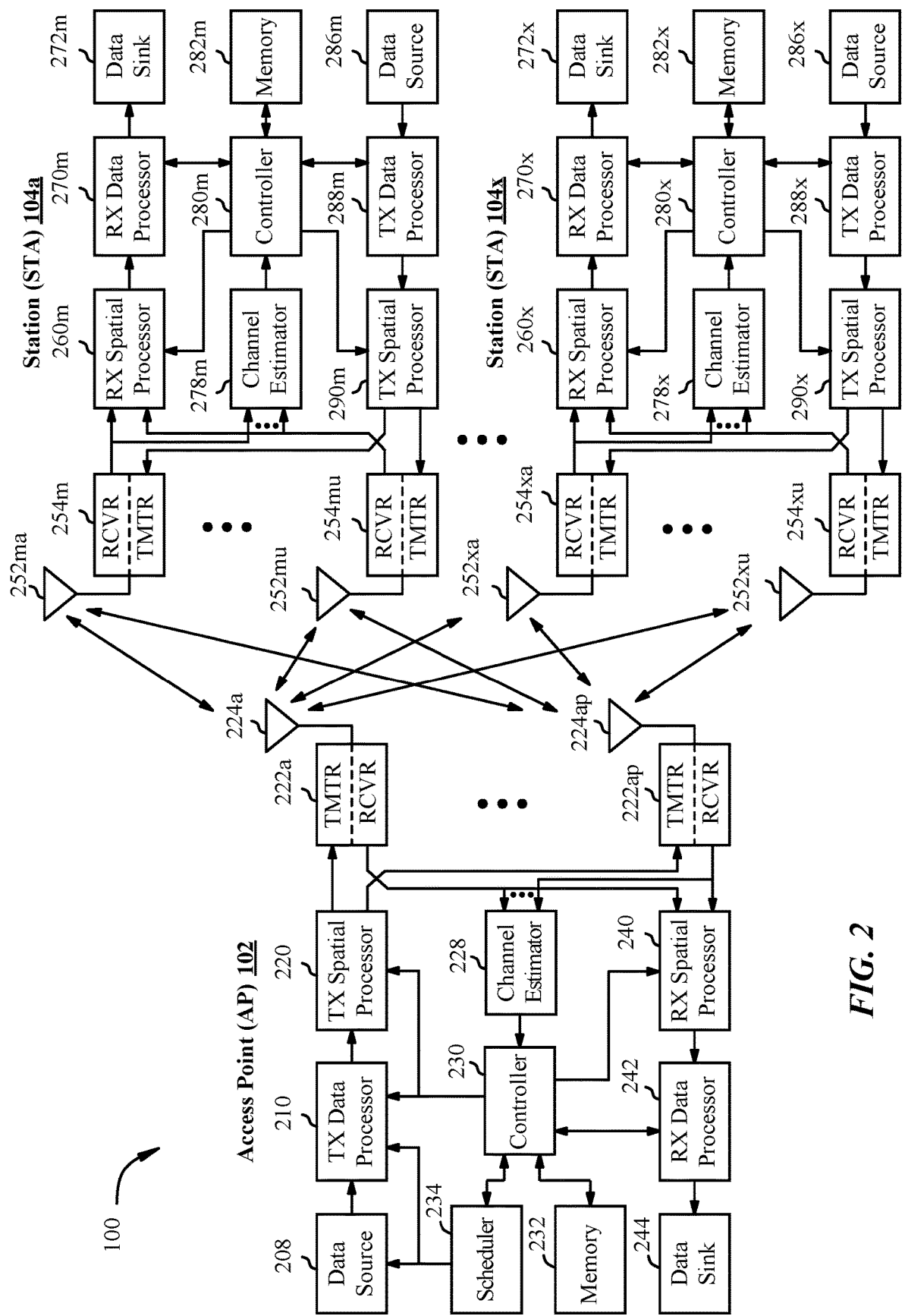
FIG. 2 is a diagram illustrating hardware aspects of an access point and two stations.

FIG. 2 illustrates a block diagram of an AP 102 and two STAs 104a and 104x in a BSS. The AP 102 is equipped with $N_t$ antennas 224a through 224t. STA 120m is equipped with $N_{ut,m}$ antennas 252ma through 252mu, and STA 120x is equipped with $N_{ut,x}$ antennas 252xa through 252xu. The AP 102 is a transmitting entity for the downlink and a receiving entity for the uplink. Each STA 104 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each STA 104 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the AP 102.

$N_{up}$ STAs may be scheduled for simultaneous transmission on the uplink. Each of these STAs performs spatial processing on its data symbol stream and transmits its set of transmit symbol streams on the uplink to the AP 102.

At the AP 102, $N_{ap}$ antennas 224a through 224ap receive the uplink signals from all $N_{up}$ STAs transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective STA. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at AP 102, a TX data processor 210 receives traffic data from a data source 208 for $N_{dn}$ STA scheduled for downlink transmission, control data from a controller 230, and possibly other data from a scheduler 234. The various types of data may be sent on different transport channels. TX data processor 210 processes (e.g., encodes, interleaves, and modulates) the traffic data for each STA based on the rate selected for that STA. TX data processor 210 provides $N_{dn}$ downlink data symbol streams for the $N_{dn}$ STA. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the STA.

At each STA 120, $N_{ut,m}$ antennas 252 receive the $N_{ap}$ downlink signals from AP 102. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the STA. The receiver spatial processing is performed in accordance with the CCMI, MMSE or some other technique. An RX data processor 270 processes (e.g., demodulates, deinterleaves and decodes) the recovered downlink data symbol stream to obtain decoded data for the STA.

At each STA 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each STA typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each STA may send feedback information (e.g., the downlink and/or uplink eigenvectors, eigenvalues, SNR estimates, and so on) to the access point. Controllers 230 and 280 also control the operation of various processing units at AP 102 and STA 104, respectively.

Figure 3:
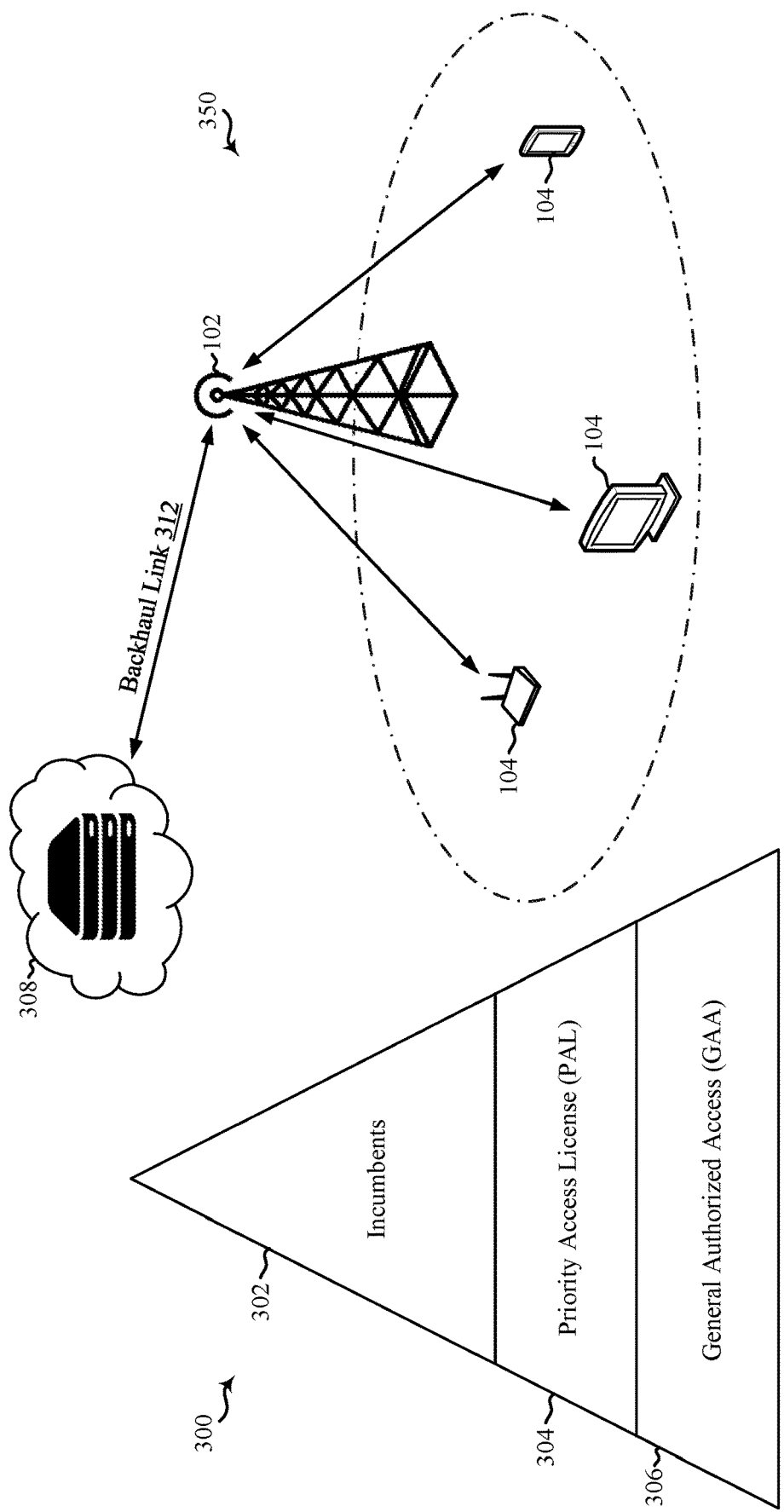
FIG. 3 is a schematic diagram of a three-tiered organization for a new operational band and an example basic service set (BSS).

FIG. 3 is a schematic diagram of a three-tiered organization 300 for a new operational band (e.g., a 3.5 GHz operational band) including a spectrum access system (SAS) 308, an AP 102 operating as a citizens band service device (CBSD), incumbent systems 302, priority access license (PAL) systems 304, and general authorized access systems 306 that may be used in accordance with the disclosed embodiments. In 2016, the FCC made available citizens broadband radio service (CBRS) spectrum in the 3550-3700

MHz (3.5 GHz) band, making 150 MHz of spectrum available for mobile broadband and other commercial users. The CBRS is unique, in that it makes available a comparatively large amount of spectrum (frequency bandwidth) without the need for expensive auctions, and without ties to a particular operator or service provider.

Incumbent access (existing DOD and satellite) include authorized federal and grandfathered fixed satellite service (FSS) users currently operating in the 3.5 GHz band. These users may be protected from harmful interference from PAL systems 304 and GAA systems 306.

The PAL systems 304 may operate on priority access licenses that will be assigned using competitive bidding within the 3550-3650 MHz portion of the band. Each PAL is defined as a non-renewable authorization to use a 10 MHz channel in a single census tract for a number of years. Any suitable number of PALs may be assigned in any given census tract, with potentially multiple PALs going to any single applicant. In one example, up to 7 PALs may be allowed within a census tract, with no more than 4 PALs going to a single applicant. However, any suitable number of assignments and/or licenses may be used.

The GAA systems 306 (for any user with an authorized 3.5 GHz device) may be licensed-by-rule to permit open, flexible access to the band for the widest possible group of potential users. GAA systems 306 may be permitted to use any portion of the 3550-3700 MHz band not assigned to a higher tier user and may also operate opportunistically on unused PAL channels.

The PAL systems 304 and GAA systems 306 may be regulated under a Citizens Broadband Radio Service (CBRS). CBSDs (e.g., access points (APs) 102) may only operate under authority of a SAS 308. For example, the CBSD/AP may operate as either a PAL or as a GAA user. Rules are optimized for small-cell use, but also accommodate point-to-point and point-to-multipoint, especially in rural areas.

Thus, aspects of the disclosure are directed to methods and techniques for operating on the 3.5 GHz band in view of the unique rules and characteristics associated with the band.

Examples of a Standalone Mode of Operation

FIG. 3 also includes a network schematic illustrating an example wireless communication network 350 or basic service set (BSS). Here, the communication network 350 includes a standalone AP (e.g., AP 102 of FIG. 1) configured with a backhaul link 312 for communication between the SAS 308 and the AP 102. By the backhaul link 312, the SAS 308 can notify the AP 102 that the AP 102 can no longer operate on the 3.5 GHz band (e.g., because of an incumbent or the like), or that the AP 102 can return to the 3.5 GHz band if the AP 102 is currently operating on a legacy band (e.g., 2.4 GHz band, 5 GHz band, 6 GHz band, etc.). Here, the AP 102 is a standalone AP, meaning that the AP 102 operates only on the 3.5 GHz operational band, unless the AP 102 is removed from the 3.5 GHz band by the SAS 308. Thus, a standalone mode of operation may relate to a mode of communication between the AP 102 and one or more STAs 104, wherein the AP primarily operates on the 3.5 GHz operational band.

Standalone operation on a new operational band such as the 3.5 GHz band may result in problems with the number of STAs 104 that are capable of associating with the AP 102. For example, because such an AP 102 only operates on the 3.5 GHz band, there may be relatively few devices or STAs 104 that are configured to operate on the new band. Moreover, even if there are STAs 104 capable of using the 3.5 GHz band, those devices may not even scan the spectrum for the 3.5 GHz band because legacy bands are much more prolific and generally widely available. Thus, certain problems may arise with how an STA 104 can discover a standalone AP 102 operating on the 3.5 GHz band, and how the STA associates with the standalone AP.

In one example, an STA 104 may be configured out-of-band to discover a standalone AP 102 operating in a 3.5 GHz band. For example, prior to discovery, the STA 104 may be provisioned with credentials (e.g., security codes, expected SSID of the standalone AP, etc.) to enable wireless communication via one or more channels of the new operating band. For example, the STA 104 may be manufactured with the capability to communicate over the 3.5 GHz band, or the STA 104 may be configured by an enterprise or user prior to association with the 3.5 GHz band. Thus, the STA 104 may be configured to associate with the standalone AP 102 prior to association with the AP 102 (e.g., pre-configuration of the STA).

In some examples, the STA 104 may be configured at least in part by the standalone AP 102 after or during association with the AP 102. In some examples, the AP 102 may dynamically configure the STA 104 for communication over the 3.5 GHz band after association (e.g., provide the STA with network updates, timing information, etc.). In some examples, the STA may be configured with a particular location (e.g., global positioning system (GPS) coordinates, etc.) associated with a standalone AP 102 location. In such an example, when an STA 104 determines that it is within the particular location, then the STA 104 may scan the 3.5 GHz band to find and associate with the standalone AP. Thus, an STA 104 may be pre-provisioned with security credentials for the 3.5 GHz band, and it will scan for a 3.5 GHz AP when it is in a particular locality. The STAs 104 may be configured to operate on the 3.5 GHz band during manufacturing, or the STAs 104 may be configured via some out-of-band means (e.g., a enterprise/commercial or end user configures the device after manufacturing).

The AP 102 may reduce wireless communication overhead on the 3.5 GHz band by increasing an offset time between transmission of advertisement/control frames (e.g., a beacon frame, probe response frame, block ACKs, trigger frames, other management frames, etc.). That is, the AP may reduce the frequency (e.g., increase the periodic interval) with which management frames are transmitted by increasing the amount of time between each management frame transmission. Such reduction of management frames may increase the amount of resources available for communication of data between the AP 102 and the STAs 104. Typically, an AP 102 may transmit a beacon frame every 100 ms, but beacon frames convey a lot of information and require a significant amount of time and frequency resources to be transmitted. Thus, in some examples, the AP 102 may transmit beacon frames less frequently. For example, the AP 102 may transmit a beacon frame every 500 ms or every 1 second. However, in order to convey enough information to allow an STA 104 to associate with the AP 102, the AP 102 may periodically broadcast a short frame that requires less time and frequency resources than the beacon frame.

In one example, the short frame may be an unsolicited broadcast probe response (UBPR) fame. In another example, the short frame may include one or more of a traffic indicator map (TIM) frame, or a fast initial link setup (FILS) discovery (FD) frame. Because the short frame carries less information relative to the beacon frame and requires less time and frequency resources, the short frame can be transmitted more frequently than the beacon frame without causing too great of a footprint or taking up too many resources of the new operational band. In some examples, the AP 102 may transmit the short frame every 20 ms.

For instance, if the short frame is the UBPR frame, then the AP 102 and STA 104 may reduce communication overhead by eliminating at least a portion of the total probe request frames that one or more STAs 104 may transmit to the AP 102. Specifically, if the AP 102 transmits the UBPR periodically, then the STAs 104 may simply wait until the next UBPR broadcast to determine whether to associate with the AP 102 instead of first transmitting the AP 102 a probe request frame and expecting the AP 102 to respond to each probe request frame from multiple STAs 104. Thus, the STAs 104 may be configured to refrain from transmitting a probe request frame for a period of time once the STA 104 determines it is within range for communication with an AP 102. If an STA 104 does not receive the unsolicited probe response frame or discovery frame within the period of time, then the STA 104 may proceed to transmit a probe request frame. In such an example, the AP 102 and STA 104 may reduce or eliminate "probe storms" (e.g., where multiple STAs 104 all transmit probe request frames at the same time) by waiting, by the STAs 104, for an unsolicited probe response frame or discovery frame transmitted by the AP 102.

In some examples, the short frame and/or beacon frame may include an indication of a target wake time (TWT) service period (SP) to provide an STA 104 that is associated/ unassociated with the AP 102 with an indication of when the STA 104 can perform certain transmissions. For example, the short frame and/or beacon frame may include a TWT SP to provide an unassociated STA 104 with an indication of when the STA 104 can transmit an association request frame to the AP 102. In another example, the short frame and/or beacon frame may include a TWT SP to provide an associated STA 104 with an indication of when the STA 104 can contend for communication with the AP 102 (e.g., via enhanced distributed channel access (EDCA) based access) or an indication of when the AP 102 will send a trigger frame to solicit an uplink from the STA 104. Thus, by controlling the uplink communications, the AP 102 can make communications over the 3.5 GHz band more efficient.

Similarly, the AP 102 may manage STA access to the 3.5 GHz band by disallowing or discouraging unsolicited uplink communications from STAs 104 over the 3.5 GHz band. For example, the AP 102 may control the frequency and timing of certain SPs, and thus, control when an STA 104 is able to communicate with the AP 102. Thus, in some examples, the AP 102 may control STA 104 transmissions by scheduling the STAs 104 based on the type of traffic associated with each STA 104 (e.g., low latency traffic, best effort traffic, unassociated, etc.). In this example, the AP 102 may provide an STA 104 with low latency traffic with more opportunity for uplink transmissions than, for example, an STA 104 with best effort traffic or an STA 104 that is unassociated with the AP 102. The AP 102 may also determine how frequently to allow SPs for EDCA based access. Thus, by controlling/ scheduling the STAs 104 via TWTs, the AP 102 is able to reduce the overhead of messages being transmitted over the 3.5 GHz band.

In certain aspects, an STA 104 may be configured to notify a standalone AP 102 that it has data to send to the AP 102. In one example, an STA 104 that is associated with the standalone AP 102 may provide the AP 102 with a buffer status report (BSR) via an uplink orthogonal frequency-division multiple access (OFDMA) random access (UORA) and/or a null data packet (NDP) feedback report poll (NFRP). Here, the BSR may operate as a request from an STA 104 to the AP 102 for the AP 102 to trigger or schedule the STA 104 for uplink communication to the AP 102. For an STA 104 that is unassociated with the standalone AP 102, the STA 104 may transmit an association request frame or probe request frame to the AP 102 via UORA. In this way, the STA 104 can efficiently notify the standalone AP 102 that it has data to provide the AP 102.

It should be noted that in some examples, the SAS 308 may instruct the AP 102 to leave the 3.5 GHz band or move onto another channel within the 3.5 GHz band. In one example, the AP 102 may move off the 3.5 GHz band and take the STAs 104 of its BSS to another operational band. This, in order to maintain communications within the BSS, the AP 102 may perform an extended channel switch announcement (ECSA) to move its BSS from the 3.5 GHz band to a legacy operational band (e.g., 2.4 GHz, 5 GHz, 6 GHz, etc.). Similarly, the AP 102 may use ECSA to take the STAs 104 to an alternative channel within the 3.5 GHz band that the AP 102 can use. The SAS 308 may notify the AP 102 via the backhaul link 312 when the AP 102 is allowed to return to the 3.5 GHz band. When able to return, the AP 102 may perform another ECSA and move its BSS back.

Figure 4:
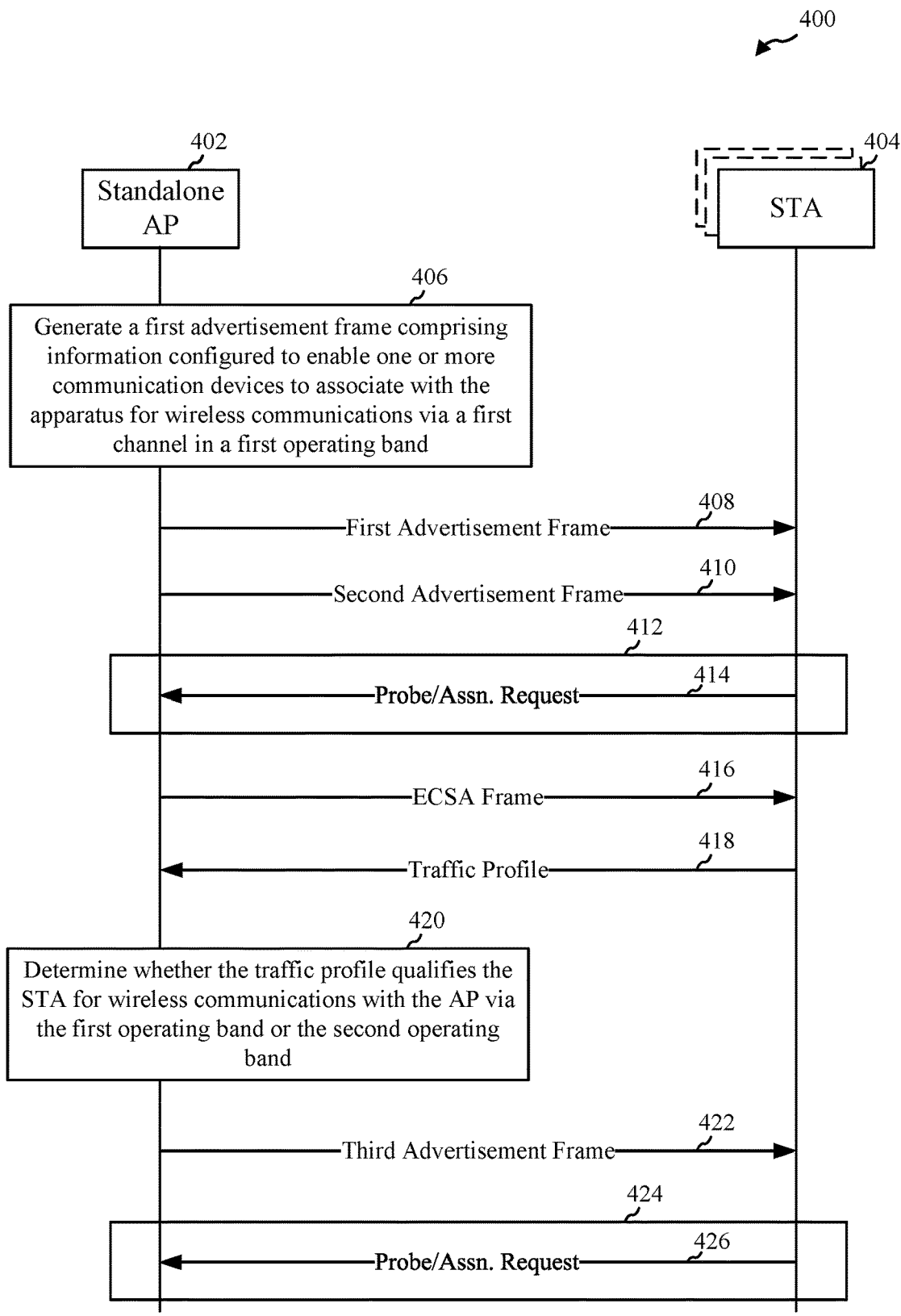
FIG. 4 is a call-flow diagram illustrating example communications between a standalone access point (AP) and one or more stations (STAs) including a first STA.

FIG. 4 is a call-flow diagram 400 illustrating example communications between a standalone AP 402 and one or more STAs including a first STA 404.

Initially, the AP 402 may generate 406 a first advertisement frame comprising information configured to enable the one or more STAs to associate with the AP 402 for wireless communications via a first channel in a first operating band. As discussed, the first advertisement frame may include at least one of a TIM frame, an FD frame, and/or a UBPR frame. The information configured to enable the one or more STAs to associate with the AP 402 may include synchronization/timing information (e.g., TIM), an indication of whether there was a critical update in the first advertisement frame (e.g., EDCA parameters, protocol changes), a traffic announcement, an SSID of the AP 402, and any other information suitable for providing to an associated or unassociated STA. The information configured to enable the one or more STAs to associate with the AP 402 may also include basic service set (BSS) parameters, including an indication of capabilities and operational parameters for the BSS.

The AP 402 may advertise its capabilities in a capabilities element (e.g., very-high throughput (VHT) capabilities element, high-efficiency (HE) capabilities element, extremely high throughput (EHT) capabilities element, etc.). The AP may also advertise other parameters depending on the features it supports (e.g., TWT element, UORA element, spatial reuse element, etc.). The AP 402 may also advertise EDCA parameters for performing channel access (e.g., minimum and maximum countdown values for each traffic access category).

The AP 402 may then transmit 408 the first advertisement frame to the first STA, or to each of the one or more STAs, according to a periodic interval. For example, if the AP 402 transmits the first advertisement frame on a 3.5 GHz band, the periodic interval may be relatively wide (e.g., the first advertisement frame is transmitted every 500 ms or 1 sec.). Also, if the AP 402 transmits the first advertisement frame on a 3.5 GHz band, then the first advertisement frame may be a short frame instead of a beacon frame, as discussed above, in order to reduce the amount of signaling overhead on the 3.5 GHz band.

In certain aspects, the first advertisement frame is transmitted via a second channel in a second operating band (e.g., in a non-3.5 GHz band and channel). That is, the AP 402 may advertise the 3.5 GHz band on another operating band (e.g., a legacy band) to reduce the amount of signaling overhead on the 3.5 GHz band. In this example, the first advertisement frame may include a beacon frame or a probe response frame, and may also include a reduced neighbor report (RNR) information element (IE). The RNR IE may be configured to provide the one or more STAs with the necessary information to associate with the AP 402 via one or both of: (i) the first channel in the first operating band, or (ii) the second channel in the second operating band.

In some examples, the first advertisement frame includes a do not transmit (DNT) field or DNT information configured to prevent the one or more STAs from communicating over at least one of the second channel or the second operating band. For example, the DNT may prevent the one or more STAs from transmitting a probe request or an association request to the AP 402 via the 3.5 GHz band.

In some examples the first advertisement frame is a beacon frame, and the AP 402 is further configured to generate and transmit 410 a second advertisement frame. The second advertisement frame may include at least one of synchronization/timing information, a traffic announcement, or an operational parameter. The second advertisement frame may be transmitted according to another periodic interval that is more frequent (e.g., every 20 ms) than the periodic interval of the first advertisement frame. The second advertisement frame may be one or more of a TIM frame, an FD frame, or a UBPR frame.

In some examples, the second advertisement frame is a multi-user (MU) physical layer protocol data unit (PPDU), wherein the MU PPDU includes at least one of: (i) a TIM frame and an FD frame, or (ii) the TIM frame and a UBPR frame. In some examples, the TIM frame is outputted for transmission over a first resource unit (RU), and the FD frame or the UBPR frame is outputted for transmission over a second RU. In this example, the second RU may be in a primary channel (e.g., the first channel) of the first operating band, and the first RU may be in a secondary channel of the first operating band. The primary channel may be a 20 MHz channel, and the secondary channel may be a 20/40 MHz channel. Thus, the bandwidth of the first operating band may be greater than 20 MHz.

In certain aspects, at least one of the first advertisement frame and the second advertisement frame may include information or a field/element indicating a TWT SP 412, during which the one or more STAs can transmit an association request frame to the AP 402 via the first channel. For example, the first STA 404 may receive the at least one of the first advertisement frame or the second advertisement frame, determine the timing and frequency of the TWT SP 412, and transmit a probe request or an association request 414 to the AP 402 within the TWT SP 412. In certain aspects, the first STA 404 may refrain from transmitting a probe request frame or an association request frame until it first receives the at least one of the first advertisement frame or the second advertisement frame.

In certain aspects, the AP 402 may receive, from an SAS, an indication that the first operating band is unavailable. For example, another entity (e.g., an incumbent) may have priority to use the first operating band. In response to the indication, the AP 402 may transmit 416, to the one or more STAs, an extended channel switch announcement (ECSA) frame advertising that the AP 402 is moving from the first channel in the first operating band to a second channel in a second operating band. This way, the AP 402 may move its BSS to another operating band in order to maintain communications within the BSS. For example, if the first operating band is a 3.5 GHz band, then the second operating band may be a legacy band.

In certain aspects, the first STA 404 may transmit 418 an indication of its traffic profile to the AP 402. The traffic profile may include information regarding the type of data that the first STA 404 transmits (e.g., associated QoS, subscriber information, association information, etc.). It should be noted that the first STA 404 may transmit the traffic profile to the AP 402 using either of the 3.5 GHz band or the legacy band. However, by transmitting the traffic profile over the legacy band, the AP 402 is able to reduce the amount of signaling over the 3.5 GHz band. By reducing signaling over the 3.5 GHz band, the AP 102 is more readily capable of providing a channel for STAs that require low latency and/or high reliability communications in the 3.5 GHz band. In response to receiving the traffic profile, the AP 402 may determine 420 whether the traffic profile qualifies the first STA 404 for wireless communications with the AP 402 via the first operating band or the second operating band.

For example, if the traffic profile indicates that the first STA 404 transmits low latency and/or high reliability data, then the AP 402 may transmit 422 a third advertisement frame to the first STA 404 advertising the first operating band (e.g., the 3.5 GHz band) because of the low signaling overhead of the band. If the traffic profile indicates that the first STA 404 transmits best effort data, or is unassociated with the AP 402, then the third advertisement frame may advertise the second operating band for communication between the first STA 404 and the AP 402. The third advertisement frame may include an indication of a TWT SP 424 indicating a time for the first STA 404 to transmit a probe request or an association request 426 to the AP 402 in response to the third advertisement.

Examples of a Supplemental Mode of Operation

The supplemental mode of operation relates a mode of communication between an AP and an STA, wherein the new operational band link of an AP is supplemented another AP using a legacy band link. Aspects of the supplemental mode include techniques and methods of reducing communication overhead in a 3.5 GHz band link by using supplemental links over legacy bands. Other aspects of the supplemental mode are directed to prioritizing the availability of the new operational band to STAs that need it most (e.g., based on the traffic profile of each STA). Other aspects of the supplemental mode are directed to scheduling access to the new operational band to make the band more efficient.

Figure 5:
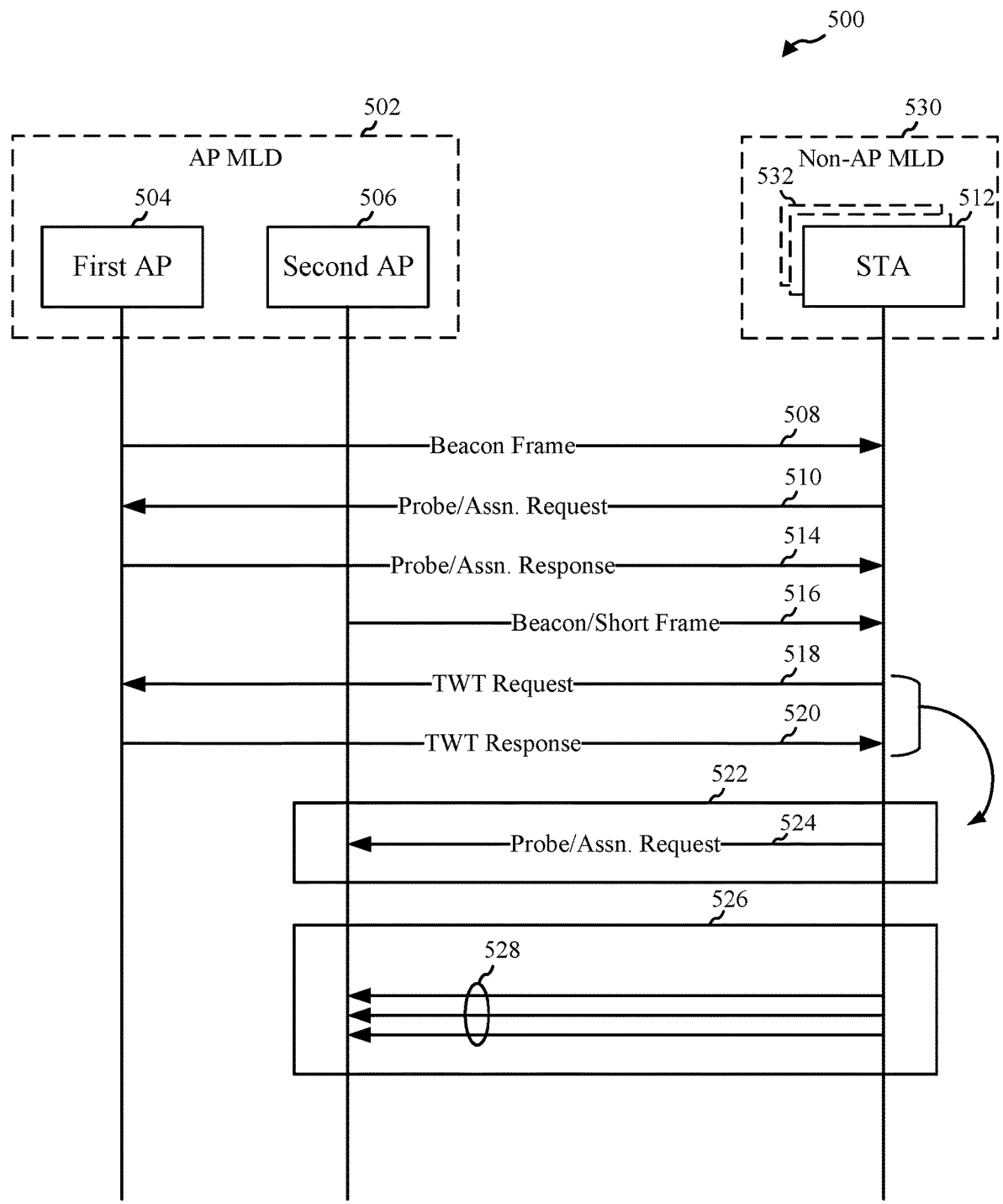
FIG. 5 is a call-flow diagram illustrating an AP multi-link device (MLD) including a first AP and a second AP.

FIG. 5 is a call-flow diagram illustrating an AP multi-link device (MLD) 502 including a first AP 504 and a second AP 506. The first AP 504 performs communications with one or more STAs including a first STA 512 over a first communication link using a legacy band (e.g., 2.4 GHz, 5 GHz, 6 GHz, etc.), and the second AP 506 performs communications with the one or more STAs over a second communication link using a 3.5 GHz band. In the example of an AP MLD 502, the first AP 504 and the second AP 506 may be collocated. Alternatively, the first AP 504 and the second AP 506 may be separate pieces of hardware but located in the same neighborhood. In some examples, the one or more STAs may include a plurality of STAs that are part of a non-AP MLD 530. For example, the non-AP MLD 530 may include the first STA 512 and a second STA 532, wherein communication between the AP MLD 502 and the non-AP MLD 530 may include: communications over a first band (e.g., the 3.5 GHz band or a legacy band) between the first AP 504 and the first STA 512, and communications over a second band (e.g., the other of the 3.5 GHz band or the legacy band) between the second AP 506 and the second STA 532. That is, in certain aspects, communications made over a legacy bandwidth versus communications made over the 3.5 GHz bandwidth may be made by a different pair of STAs and APs.

In the illustrated example, the first AP 504 may broadcast a beacon frame 508 over the legacy band. In some examples, the beacon frame reports the 3.5 GHz band used by the second AP 506 to STAs over the legacy band. For example, the beacon frame may carry a reduced neighbor report (RNR) information element (IE) with the information identifying the second AP 506 and the 3.5 GHz band used by the second AP 506. Accordingly, if the first STA 512 is listening to the legacy band of the first communication link, the first STA 512 can still determine that the second AP 506 uses the 3.5 GHz band even if the first STA 512 is not listening to the 3.5 GHz band. Thus, if the first STA 512 is 3.5 GHz capable, it can turn on its 3.5 GHz radio to discover and associated with the second AP 506. Note that because the beacon frame 508 is broadcast over the legacy band, the 3.5 GHz band does not have to transmit any beacon frame. It should be noted that in some examples, the first AP 504 may transmit a UBPR frame, a TIM frame, an FD frame, or a combination of the frames instead of the beacon.

In certain aspects, the first AP 504 may transmit a downlink multi-user (MU) physical layer convergence procedure (PLCP) protocol data unit (PPDU) instead of a UBPR. For example, the PPDU may carry a TIM frame and one of an FD frame or a UBPR frame, where the TIM frame is transmitted in a first resource unit (RU) and the FD frame or the UBPR frame is transmitted in a second RU. The first RU may be part of a secondary 20/40 MHz channel of the legacy band, and the second RU may be part of a primary 20 MHz channel of the legacy band. In this manner, the first AP 504 can provide information to both associated and unassociated STAs in a single transmission (e.g., unassociated STAs may monitor the primary 20 MHz channel while the associated STAs may monitor the secondary 20/40 MHz channel).

In certain aspects, one or more of the first AP 504 and the second AP 506 may prevent STAs from probing (e.g., transmitting a probe request frame or any other communications from STAs in a non-associated state) over the 3.5 GHz link. In one example, a wireless communication standard (e.g., IEEE standard) may prevent STAs from such probing. In another example, the first AP 504 may prevent STAs from probing the 3.5 GHz band by setting a DNT bit in the beacon 508 or short frame transmitted in place of the beacon 508 indicating that the first STA 512 cannot transmit over the 3.5 GHz band. In this example, the first AP 504 may change the bit to indicate that an STA can transmit over the 3.5 GHz band. In some examples, the second AP 506 may simply ignore any probing frames transmitted over the 3.5 GHz band. In certain aspects, the beacon 508 or short frame transmitted in place of the beacon 508 may indicate a TWT SP or an EDCA SP during which the one or more STAs may send association frames to the second AP 506.

In some examples, the first STA 512 may transmit a probe request or association request 510 to the first AP 504 in order to associate itself with the first AP 504. In some examples, the association request 510 may include information about the traffic profile of the first STA 512. For example, the traffic profile may include one or more of a priority, a subscriber, a quality of service (QoS), etc. of data that is communicated by the first STA 512.

In response to the association request 510, the first AP 504 may transmit a probe response or an association response 514 to the first STA 512. In some examples, the first AP 504 may not provide the first STA 512 with any information regarding the 3.5 GHz band in the association response 514. As such, the first STA 512 may not know that the 3.5 GHz band exists if the beacon frame also does not advertise the 3.5 GHz band. The first AP 504 may determine not to share 3.5 GHz band information with the STA 512 if the STA does not have the requisite traffic profile. For example, if the first STA 512 does not communicate low latency or high reliability data, then the first AP 504 may not allow the first STA 512 to use the 3.5 GHz band. However, if the first STA 512 does have the requisite traffic profile, then the first AP 504 may provide 3.5 GHz band information to the first STA 512 in the association response 514.

In certain aspects, the first AP 504 and the second AP 506 may negotiate access to the 3.5 GHz band to determine which STAs, if any, should be notified of the 3.5 GHz band. In one example, the negotiation may be based on how much traffic is on the legacy band(s). If the legacy bands have a level of traffic that causes path loss or interference, then the first AP 504 and the second AP 506 may determine to allow more STAs to use the 3.5 GHz band, and may advertise it in a broadcast frame or may to certain STAs that meet a traffic profile criteria.

In some examples, the first AP 504 and the second AP 506 may negotiate time intervals (e.g., TWT SPs) for association with the first AP 504 and/or the second AP 506. For example, based on the negotiation, the first AP 504 may provide, in the beacon frame 508 or in the association response 514, an indication of TWT SPs (e.g., start time, duration, frequency channel, etc.) that the first STA 512 may utilize for UORA-based probing or association with the first AP 504 and/or the second AP 506. In another example, the TWT SPs may be utilized for EDCA-based probing or association. In some examples, the TWT SPs may be broadcast by the first AP 504 on the legacy band(s) to the one or more STAs so that all the STAs are aware of the TWT SPs and can attempt to associate with the 3.5 GHz band during the TWT SPs. It should be noted that the TWT SPs may be determined and arranged by the second AP 506 for the 3.5 GHz band, but advertised by the first AP 504. In some examples, the TWT information may include a TWT recommendation field and a value of the field indicating that the TWT information relates to a 3.5 GHz band.

As discussed, there may be scenarios where the second AP 506 does not transmit a beacon frame or provide information regarding the 3.5 GHz band. However, there may be instances where a regulatory/governing body requires that the second AP 506 transmit a beacon frame or at least provide certain information over the 3.5 GHz band. In such cases, the second AP 506 may transmit a beacon or short frame 516 as in the standalone mode discussed above. For example, the short frame (e.g., TIM frame, FD frame, etc.) may include TWT SP information on a legacy or 3.5 GHz band.

In certain aspects, the first STA 512 may transmit, over a legacy band, a TWT request 518 to the first AP 504 in an attempt to arrange a TWT SP for communication with the second AP 506 via the 3.5 GHz band. The first STA 512 may provide traffic profile information to the first AP 504. Based on the traffic profile information, the first AP 504 may transmit a TWT response 520 to the first STA 512, providing the first STA with an indication of a TWT SP 522 on the 3.5

GHz band. Thus, the first STA 512 may transmit a probe or association request 524 to the second AP 506 during the TWT SP 522 indicated by the first AP 504.

In certain aspects, the first AP 504 may advertise a TWT SP 526 for UORA-based and/or EDCA-based probing and association frames. In this example, each of the one or more STAs may receive an indication of the 3.5 GHz band, and may transmit a probe or association request 528 to the second AP 506 during the TWT SP 526 indicated by the first AP 504.

Figure 6:
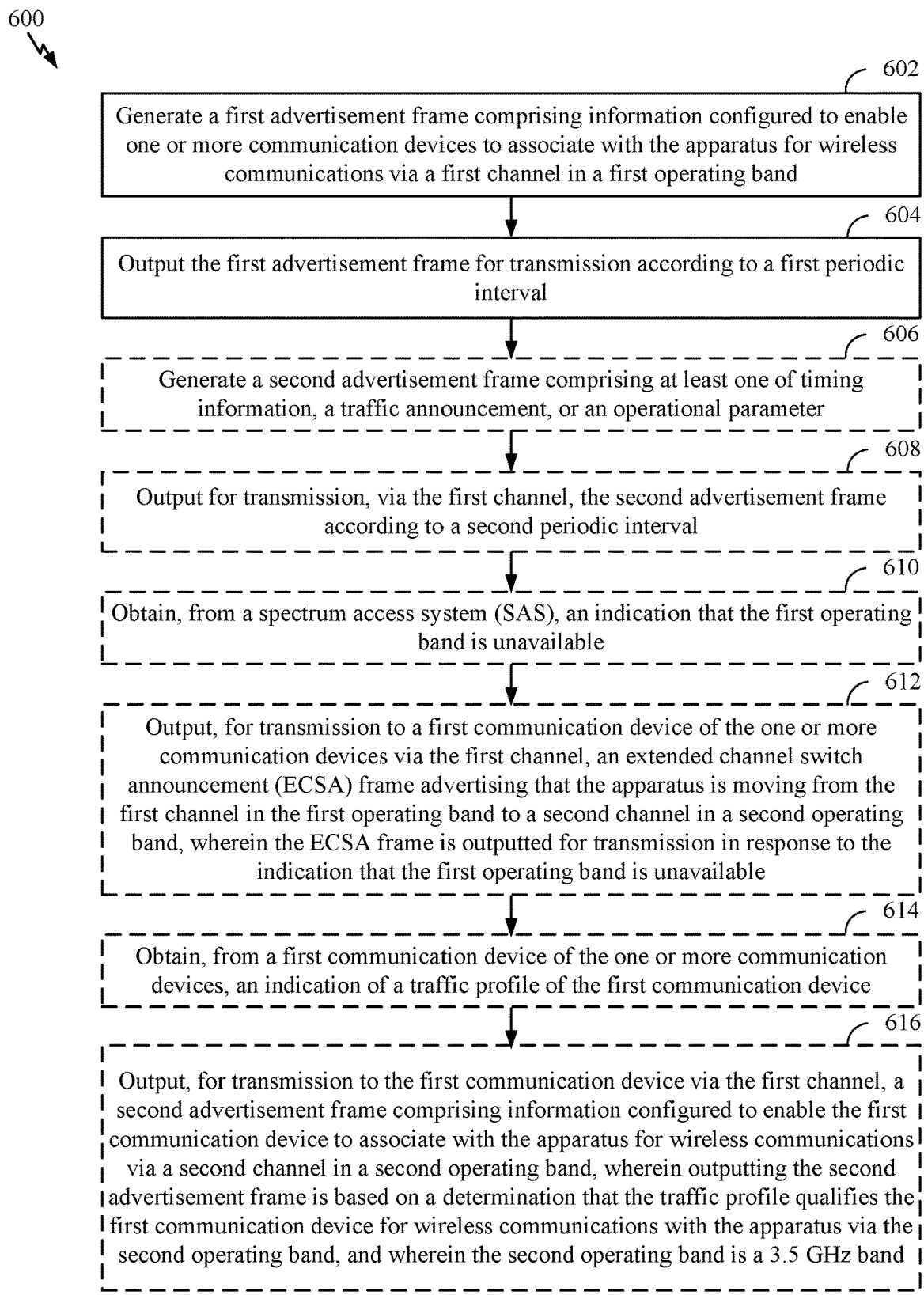
FIG. 6 is a flow diagram illustrating example operations for wireless communication.

FIG. 6 is a flow diagram illustrating example operations 500 for wireless communication. The operations 600 may be performed, for example, by an AP (e.g., such as the AP 102 of FIG. 1). The operations 600 may be implemented as software components that are executed and run on one or more processors (e.g., controller 230 of FIG. 2). Further, the transmission and reception of signals by the AP in operations 600 may be enabled, for example, by one or more antennas (e.g., antennas 224 of FIG. 2). In certain aspects, the transmission and/or reception of signals by the AP may be implemented via a bus interface of one or more processors (e.g., controller 230) obtaining and/or outputting signals.

The operations 600 begin, at a first block 602, by generating a first advertisement frame comprising information configured to enable one or more communication devices to associate with the apparatus for wireless communications via a first channel in a first operating band. For example, the AP may generate a beacon or a short frame for broadcasting to multiple STAs or for transmitting to a particular STA, as discussed above.

The operations 600 may proceed to a second block 604, by outputting the first advertisement frame for transmission according to a first periodic interval. For example, the AP may broadcast the first advertisement frame to multiple STAs or transmit the first advertisement frame to a particular STA.

The operations 600 may optionally proceed to a third block 606, by generating a second advertisement frame comprising at least one of timing information, a traffic announcement, or an operational parameter. Here, the second advertisement frame may be a short frame that is transmitted more frequently than the first advertisement frame which may be a beacon frame.

The operations 600 may optionally proceed to a fourth block 608, by outputting for transmission, via the first channel, the second advertisement frame according to a second periodic interval. Here, the second periodic interval may be more frequency than the first periodic interval. For example, in certain aspects, the first periodic interval is greater than the second periodic interval.

In certain aspects, the second advertisement frame comprises at least one of a traffic indication map (TIM) frame, a fast initial link setup (FILS) discovery (FD) frame, or an unsolicited broadcast probe response (UBPR) frame. As such, the second advertisement frame may be a short frame, to the extent it uses fewer resources than a beacon frame, for example.

In certain aspects, the second advertisement frame comprises a multi-user (MU) physical layer protocol data unit (PPDU). In one example, the MU PPDU comprises one of: (i) a traffic indication map (TIM) frame and a fast initial link setup (FILS) discovery (FD) frame, or (ii) the TIM frame and an unsolicited broadcast probe response (UBPR) frame. In certain aspects, the TIM frame is outputted for transmission over a first resource unit (RU), and the FD frame or the UBPR frame is outputted for transmission over a second RU. In one example, the second RU is in a primary channel of the first operating band, wherein the first RU is in a secondary channel of the first operating band, and wherein a bandwidth of the first operating band is greater than 20 MHz. In such an arrangement, both associated and un-associated STAs may receive data from an AP.

In certain aspects, the first advertisement frame comprises an element indicating a target wake time (TWT) service period (SP) configured to indicate a time window during which the one or more communication devices can transmit an association request frame via the first channel.

In certain aspects, the first advertisement frame is outputted for transmission via the first channel, and wherein the first operating band is a 3.5 GHz band.

The operations 600 may optionally proceed to a fifth block 610, by obtaining, from a spectrum access system (SAS), an indication that the first operating band is unavailable. For example, an incumbent may kick a particular AP off of the 3.5 GHz channel.

The operations 600 may optionally include a sixth block 612, for outputting, for transmission to a first communication device of the one or more communication devices via the first channel, an extended channel switch announcement (ECSA) frame advertising that the apparatus is moving from the first channel in the first operating band to a second channel in a second operating band, wherein the ECSA frame is outputted for transmission in response to the indication that the first operating band is unavailable. Thus, the AP may move a BSS from the 3.5 GHz band to a legacy band once the 3.5 GHz band becomes unavailable.

In certain aspects, the first advertisement frame is outputted for transmission via a second channel in a second operating band. That is, the first advertisement frame may advertise a 3.5 GHz band and while being communicated over a legacy band. In certain aspects, the first advertisement frame comprises a beacon frame or a probe response frame, and wherein the information configured to enable the one or more communication devices to associate with the apparatus is provided via a reduced neighbor report (RNR) information element (IE). That is, a beacon frame or probe response frame may carry an RNR IE with the information of the 3.5 GHz band, and may be transmitted over a legacy band. So when an STA is in range, the STA receives the beacon frame and is informed of the 3.5 GHz band. Thus, if the STA is 3.5 GHz capable, it can turn on its 3.5 GHz radio to discover and associated with the 3.5 GHz AP.

In certain aspects, the first advertisement frame comprises information configured to enable the one or more communication devices to associate with the apparatus for wireless communications via at least one of the first channel in the first operating band or the second channel in the second operating band. In other words, the first advertisement frame may include information that allows an STA to associate with an AP and communicate with the AP over one or more operational bands. In certain aspects, the first operating band is a 3.5 GHz band, and wherein the second operating band is a 2.4 GHz band, a 5 GHz band, a 6 GHz band, a 60 GHz band, or a 900 MHz band. In certain aspects, the first advertisement frame comprises do not transmit (DNT) information configured to prevent the one or more communication devices from transmitting over at least one of the second channel or the second operating band.

The operations 600 may optionally proceed to a seventh block 614 by obtaining, from a first communication device of the one or more communication devices, an indication of a traffic profile of the first communication device.

The operations 600 may optionally proceed to an eighth block 616 by outputting, for transmission to the first communication device via the first channel, a second advertisement frame comprising information configured to enable the first communication device to associate with the apparatus for wireless communications via a second channel in a second operating band, wherein outputting the second advertisement frame is based on a determination that the traffic profile qualifies the first communication device for wireless communications with the apparatus via the second operating band, and wherein the second operating band is a 3.5 GHz band. In certain aspects, the second advertisement frame comprises a target wake time (TWT) service period (SP) indicating a time for the first communication device to communicate with the apparatus.

Figure 7:
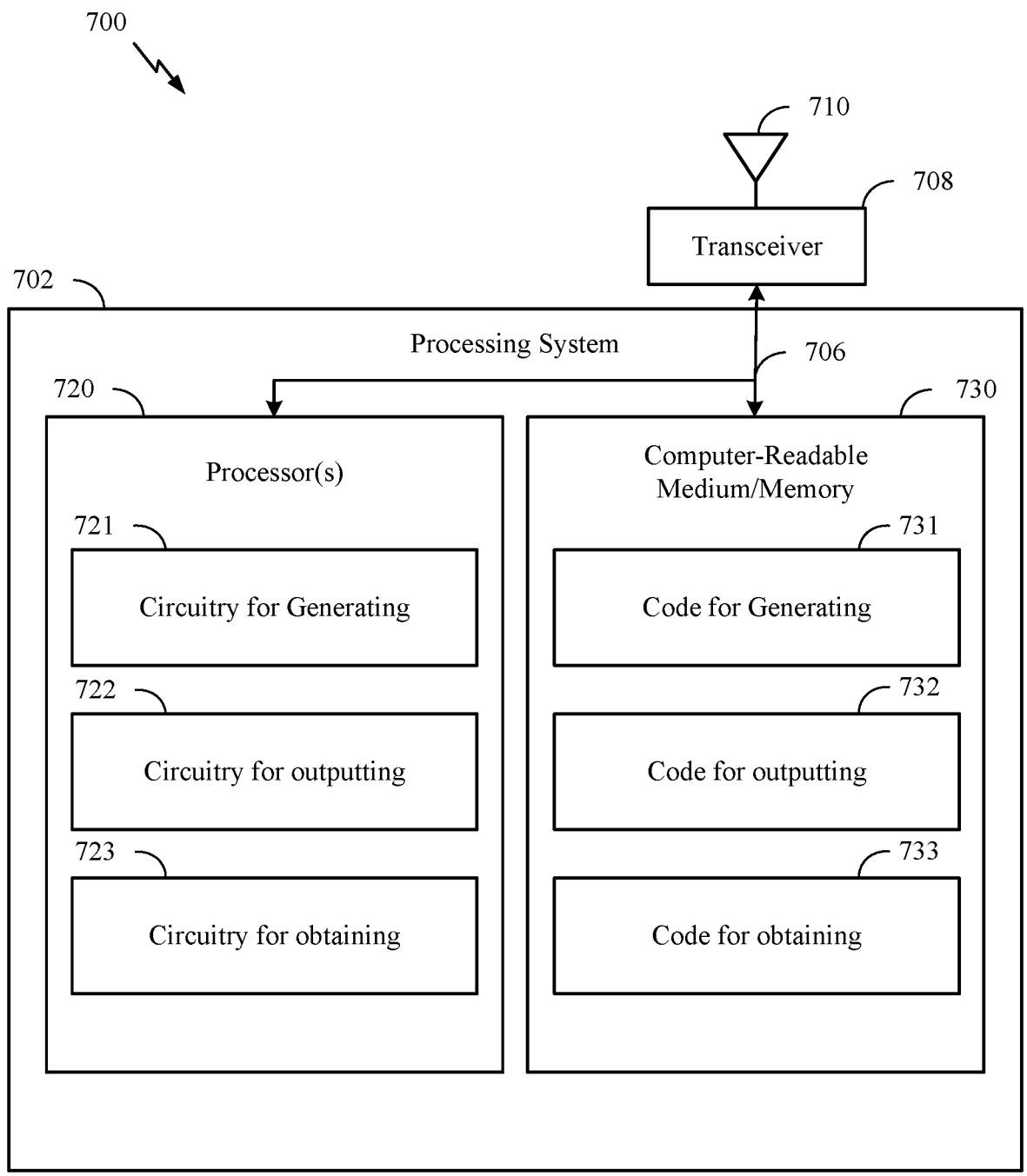
FIG. 7 depicts an example communications device that includes various components operable, configured, or adapted to perform operations for the techniques disclosed herein, such as the operations depicted and described with respect to FIG. 6.

FIG. 7 depicts an example communications device 700 that includes various components operable, configured, or adapted to perform operations for the techniques disclosed herein, such as the operations depicted and described with respect to FIG. 6. In some examples, communication device 700 may be an AP 102 as described, for example with respect to FIGS. 1-3.

Communications device 700 includes a processing system 702 coupled to a transceiver 708 (e.g., a transmitter and/or a receiver). Transceiver 708 is configured to transmit (or send) and receive signals for the communications device 700 via an antenna 710, such as the various signals as described herein. Processing system 702 may be configured to perform processing functions for communications device 700, including processing signals received and/or to be transmitted by communications device 700.

Processing system 702 includes one or more processors 720 coupled to a computer-readable medium/memory 730 via a bus 706. In certain aspects, computer-readable medium/memory 730 is configured to store instructions (e.g., computer-executable code) that when executed by the one or more processors 720, cause the one or more processors 720 to perform the operations illustrated in FIG. 6, or other operations for performing the various techniques discussed herein.

In the depicted example, computer-readable medium/memory 730 stores code 731 for generating a first advertisement frame comprising information configured to enable one or more communication devices to associate with the apparatus for wireless communications via a first channel in a first operating band; and generating a second advertisement frame comprising at least one of timing information, a traffic announcement, or an operational parameter. For example, as shown in the first block 602 and the third block 606 of FIG. 6.

The computer-readable medium/memory 730 also stores code 732 for outputting the first advertisement frame for transmission according to a first periodic interval; outputting for transmission, via the first channel, the second advertisement frame according to a second periodic interval; outputting, for transmission to a first communication device of the one or more communication devices via the first channel, an extended channel switch announcement (ECSA) frame advertising that the apparatus is moving from the first channel in the first operating band to a second channel in a second operating band, wherein the ECSA frame is outputted for transmission in response to the indication that the first operating band is unavailable; outputting, for transmission to the first communication device via the first channel, a second advertisement frame comprising information configured to enable the first communication device to associate with the apparatus for wireless communications via a second channel in a second operating band, wherein outputting the second advertisement frame is based on a determination that the traffic profile qualifies the first communication device for wireless communications with the apparatus via the second operating band, and wherein the second operating band is a 3.5 GHz band. For example, as shown in the second block 604, the fourth block 608, the sixth block 612, and the eighth block 616 of FIG. 6.

The computer-readable medium/memory 730 also stores code 733 for obtaining, from a spectrum access system (SAS), an indication that the first operating band is unavailable; and obtaining, from a first communication device of the one or more communication devices, an indication of a traffic profile of the first communication device. For example, as shown in the fifth block 610 and the seventh block 614 of FIG. 6.

In the depicted example, the one or more processors 720 include circuitry configured to implement the code stored in the computer-readable medium/memory 730, including circuitry 721 for generating, circuitry 722 for outputting, and circuitry 723 for obtaining.

Various components of communications device 700 may provide means for performing the methods described herein, including with respect to FIG. 6. In some examples, means for transmitting, outputting, or sending (or means for outputting for transmission) may include the transceivers 232 and/or antenna(s) 224 of the AP 102 illustrated in FIG. 2 and/or transceiver 708 and antenna 710 of the communication device 700 in FIG. 7. In some examples, means for receiving (or means for obtaining) may include the transceivers 222 and/or antenna(s) 224 of the AP illustrated in FIG. 2 and/or transceiver 708 and antenna 710 of the communication device 700 in FIG. 7.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for determining, means for refraining from outputting, means for switching, means for setting, and means for selecting, may include various processing system components, such as: the one or more processors 720 in FIG. 7, or aspects of the AP 102 depicted in FIG. 2, including receive processor 240, transmit processor 220, TX data processor 210, and/or controller 230.

Notably, FIG. 7 is an example, and many other examples and configurations of communication device 700 are possible.

Figure 8:
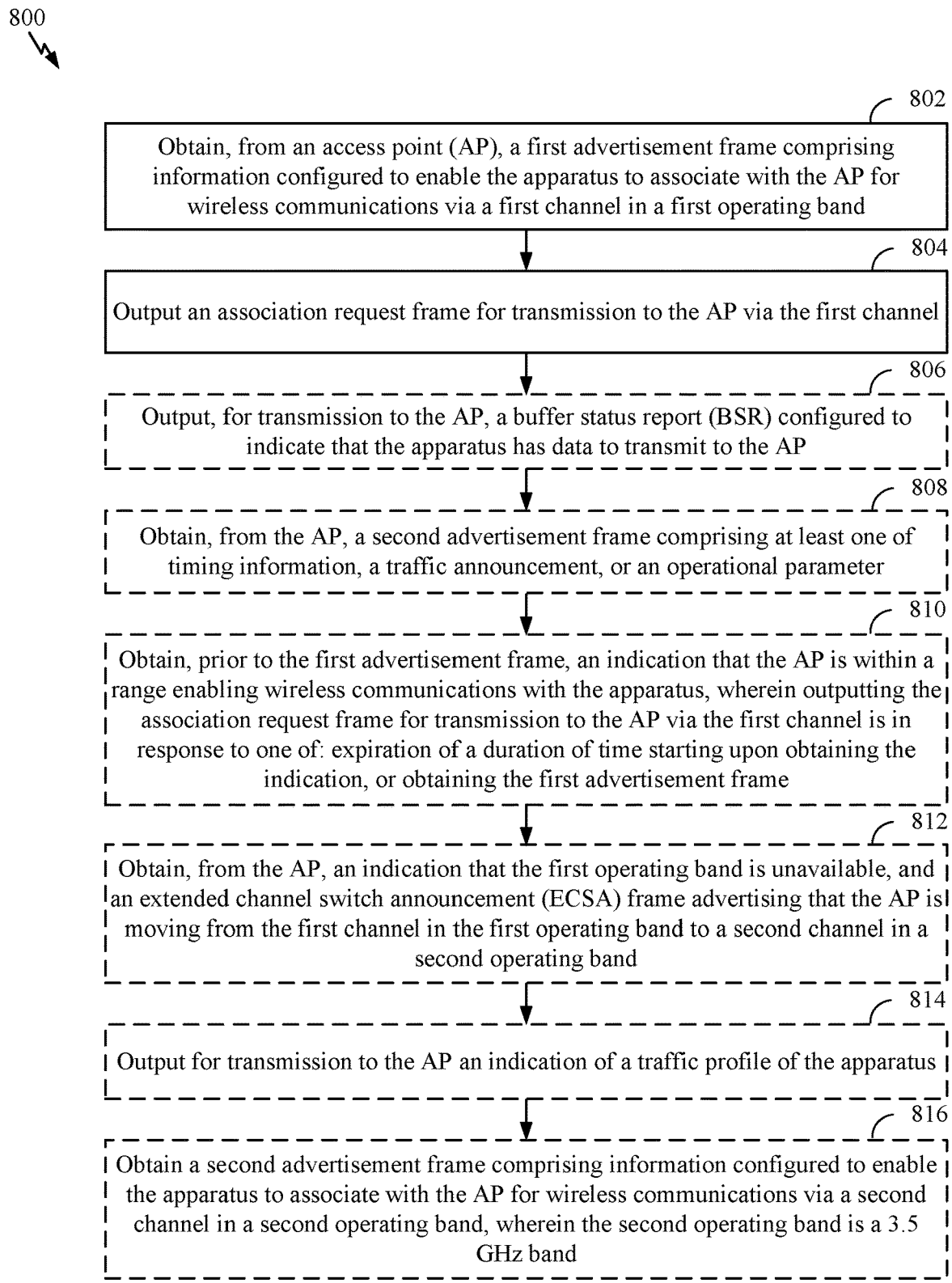
FIG. 8 is a flow diagram illustrating example operations for wireless communication, in accordance with certain aspects of the present disclosure.

FIG. 8 is a flow diagram illustrating example operations 800 for wireless communication, in accordance with certain aspects of the present disclosure. The operations 800 may be performed, for example, by a station (e.g., STA 104 of FIGS. 1-3). The operations 800 may be implemented as software components that are executed and run on one or more processors (e.g., controller 280 of FIG. 2). Further, the transmission and reception of signals by the STA in operations 800 may be enabled, for example, by one or more antennas (e.g., antennas 252 of FIG. 2). In certain aspects, the transmission and/or reception of signals by the STA may be implemented via a bus interface of one or more processors (e.g., controller 280) obtaining and/or outputting signals.

The operations 800 begin, at a first block 802, by obtaining, from an access point (AP), a first advertisement frame comprising information configured to enable the apparatus to associate with the AP for wireless communications via a first channel in a first operating band. In some examples, an advertisement frame may include a beacon frame, block ACKs, trigger frames, other management frames, etc.

The operations 800 may proceed, at a second block 804, by outputting an association request frame for transmission to the AP via the first channel. For example, an STA transmit a probe request frame to an AP in response to the first advertisement frame. In some examples, an STA may be configured to refrain from transmitting a probe request frame for a period of time once the STA determines it is within range for communication with an AP. If an STA does not receive the first advertisement frame (e.g., unsolicited probe response frame or discovery frame) within the period of time, then the STA may proceed to transmit a probe request frame.

The operations 800 may optionally include a third block 806, for outputting, for transmission to the AP, a buffer status report (BSR) configured to indicate that the apparatus has data to transmit to the AP. In one example, an STA that is associated with the standalone AP may provide the AP with a buffer status report (BSR) via an uplink orthogonal frequency-division multiple access (OFDMA) random access (UORA) and/or a null data packet (NDP) feedback report poll (NFRP). Here, the BSR may operate as a request from the STA to the AP to trigger or schedule the STA for uplink communication to the AP. For an STA that is unassociated with the standalone AP, the STA may transmit an association request frame or probe request frame to the AP via UORA. In this way, the STA can efficiently notify the standalone AP that it has data to provide the AP.

The operations 800 may optionally include fourth block 808, for obtaining, from the AP, a second advertisement frame comprising at least one of timing information, a traffic announcement, or an operational parameter. In some examples, the AP may dynamically configure the STA for communication over the new operational band after association (e.g., provide the STA with network updates, timing information, etc.).

The operations 800 may optionally include fifth block 810, for obtaining, prior to the first advertisement frame, an indication that the AP is within a range enabling wireless communications with the apparatus, wherein outputting the association request frame for transmission to the AP via the first channel is in response to one of: expiration of a duration of time starting upon obtaining the indication, or obtaining the first advertisement frame. For example, an STA may be configured to refrain from transmitting a probe request frame for a period of time once the STA determines it is within range for communication with an AP. If an STA does not receive the unsolicited probe response frame or discovery frame within the period of time, then the STA may proceed to transmit a probe request frame. In such an example, the AP and STA may reduce or eliminate "probe storms" (e.g., where multiple STAs all transmit probe request frames at the same time) by waiting, by the STAs, for an unsolicited probe response frame or discovery frame transmitted by the AP.

The operations 800 may optionally include a sixth block 812, for obtaining, from the AP, an indication that the first operating band is unavailable, and an extended channel switch announcement (ECSA) frame advertising that the AP is moving from the first channel in the first operating band to a second channel in a second operating band. For example, the SAS may instruct the AP to leave the 3.5 GHz band. In such a case, the AP may move off the 3.5 GHz band and take the STAs of its BSS to another operational band. This, in order to maintain communications within the BSS, the AP may perform an extended channel switch announcement (ECSA) to move its BSS from the 3.5 GHz band to a legacy operational band (e.g., 2.4 GHz, 5 GHz, 6 GHz, etc.). The SAS may notify the AP via the backhaul link when the AP is allowed to return to the 3.5 GHz band. When able to return, the AP may perform another ECSA and move its BSS back.

The operations 800 may optionally include a seventh block 814, for outputting for transmission to the AP an indication of a traffic profile of the apparatus. In some examples, an AP may prioritize the availability of the 3.5 GHz band to STAs that need it most (e.g., based on the traffic profile of each STA). In one example, the STA may provide a traffic profile to one of the APs, notifies the AP of its a priority, subscriber, QoS, etc. The AP may then determine whether to allow the client to use new operational band. For example, if the STA uses low latency communications, then the AP may invite the STA to use the new operational band. Thus, the APs may determine who to move to new operational band, when to move, and when to move them back, etc., based on the traffic characteristics. In some examples, the APs may move STAs onto the new operational band if one or more legacy bands have too many devices on them.

The operations 800 may optionally include an eighth block 816, for obtaining a second advertisement frame comprising information configured to enable the apparatus to associate with the AP for wireless communications via a second channel in a second operating band, wherein the second operating band is a 3.5 GHz band.

In certain aspects, the one or more processors are further configured to cause the apparatus to output, for transmission to the AP, a buffer status report (BSR) configured to indicate that the apparatus has data to transmit to the AP.

In certain aspects, the first advertisement frame comprises a beacon frame, and wherein the one or more processors are further configured to cause the apparatus to obtain, from the AP, a second advertisement frame comprising at least one of timing information, a traffic announcement, or an operational parameter.

In certain aspects, the second advertisement frame comprises at least one of a traffic indication map (TIM) frame, a fast initial link setup (FILS) discovery (FD) frame, or an unsolicited broadcast probe response (UBPR) frame.

In certain aspects, the TIM frame is obtained over a first resource unit (RU), and the FD frame or the UBPR frame is outputted for transmission over a second RU.

In certain aspects, the second RU is in a primary channel of the first operating band, wherein the first RU is in a secondary channel of the first operating band, and wherein a bandwidth of the first operating band is greater than 20 MHz.

In certain aspects, the information configured to enable the apparatus to associate with the AP is provided in a reduced neighbor report (RNR) information element (IE) obtained via a beacon frame or a probe response frame.

In certain aspects, the apparatus is configured with security credentials to enable wireless communications via one or more channels in the first operating band prior to obtaining the first advertisement frame.

In certain aspects, the one or more processors are further configured to cause the apparatus to obtain, from the AP, an indication that the first operating band is unavailable, and an extended channel switch announcement (ECSA) frame advertising that the AP is moving from the first channel in the first operating band to a second channel in a second operating band.

In certain aspects, the first advertisement frame is outputted for transmission via a second channel in a second operating band, and wherein the first operating band is a 3.5 GHz band, and wherein the second operating band is a 2.4 GHz band, a 5 GHz band, a 6 GHz band, a 60 GHz band, or a 900 MHz band.

In certain aspects, the first advertisement frame comprises do not transmit (DNT) information configured to prevent the apparatus from communicating over at least one of the second channel or the second operating band.

In certain aspects, the association request frame is outputted for transmission via the first channel in response to the DNT information.

In certain aspects, the second advertisement frame comprises a target wake time (TWT) service period (SP) indicating a time for the apparatus to communicate with the AP.

In certain aspects, the second advertisement frame further comprises operational parameters associated with the 3.5 GHz band, wherein the operational parameters include at least one of a basic service set (BSS) parameter, an enhanced distributed channel access (EDCA) parameter, a transmit power parameter, a bandwidth parameter, or a puncturing pattern parameter.

In certain aspects, the transmit power parameter comprises an indication of a maximum transmit power of the apparatus, wherein the bandwidth parameter comprises an indication of a bandwidth of the second channel, wherein the puncturing pattern parameter comprises an indication of at least one channel within the 3.5 GHz band over which the apparatus cannot output data for transmission.

Figure 9:
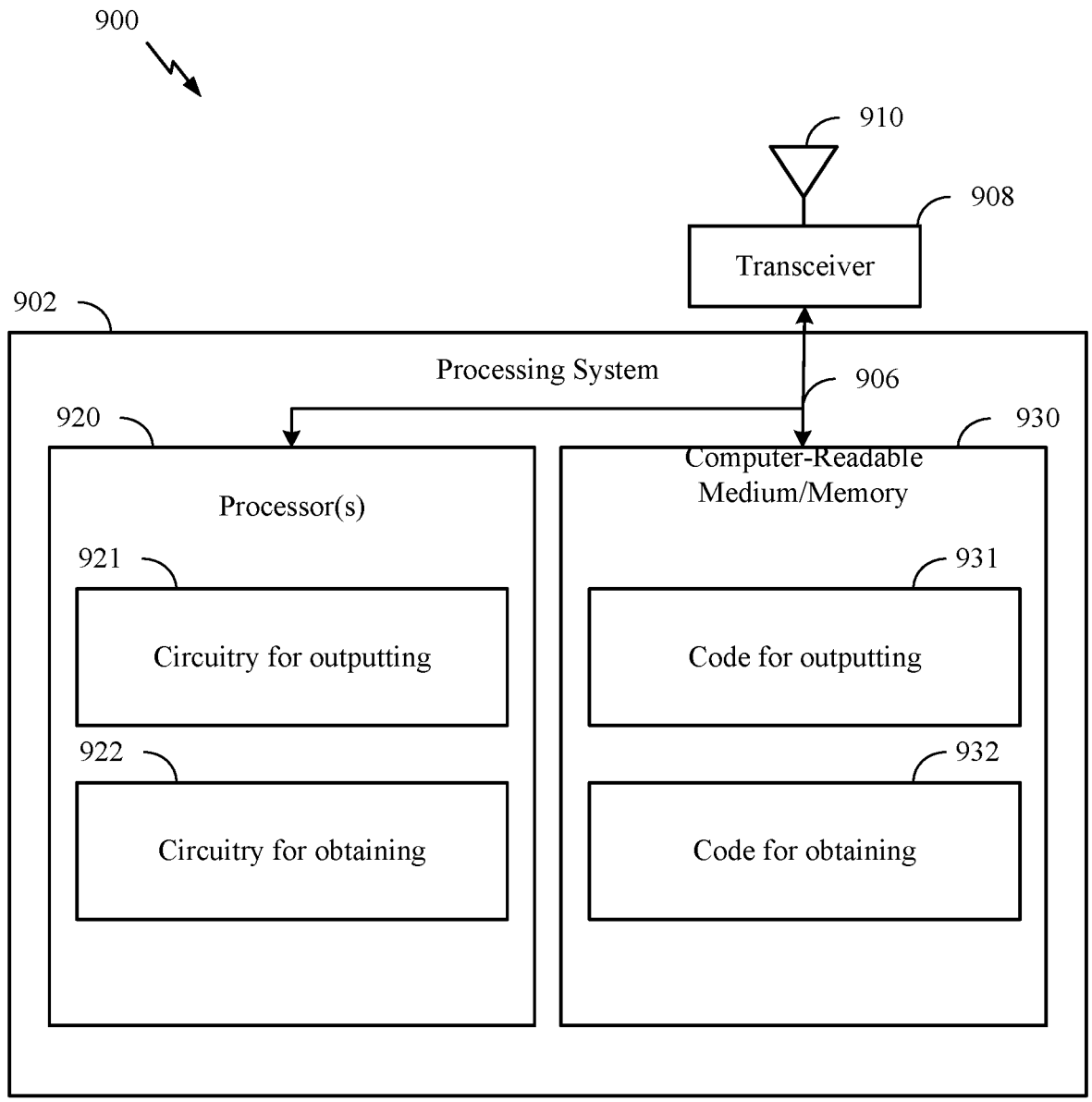
FIG. 9 depicts an example communications device that includes various components operable, configured, or adapted to perform operations for the techniques disclosed herein, such as the operations depicted and described with respect to FIG. 8.

FIG. 9 depicts an example communications device 900 that includes various components operable, configured, or adapted to perform operations for the techniques disclosed herein, such as the operations depicted and described with respect to FIG. 8. In some examples, communication device 900 may be an STA 104 as described, for example with respect to FIGS. 1-3.

Communications device 900 includes a processing system 902 coupled to a transceiver 908 (e.g., a transmitter and/or a receiver). Transceiver 908 is configured to transmit (or send) and receive signals for the communications device 900 via an antenna 910, such as the various signals as described herein. Processing system 902 may be configured to perform processing functions for communications device 900, including processing signals received and/or to be transmitted by communications device 900.

Processing system 902 includes one or more processors 920 coupled to a computer-readable medium/memory 930 via a bus 906. In certain aspects, computer-readable medium/memory 930 is configured to store instructions (e.g., computer-executable code) that when executed by the one or more processors 920, cause the one or more processors 920 to perform the operations illustrated in FIG. 8, or other operations for performing the various techniques discussed herein.

In the depicted example, computer-readable medium/memory 930 stores code 931 for obtaining a management frame, code 932 for refraining from outputting data for transmission, code 933 for obtaining repeated transmissions, code 934 for determining that the integer value satisfies an equality condition, code 935 for obtaining another management frame, code 936 for resuming output data for transmission.

In the depicted example, the one or more processors 920 include circuitry configured to implement the code stored in the computer-readable medium/memory 930, including circuitry 921 for outputting an association request frame for transmission to the AP via the first channel; outputting, for transmission to the AP, a buffer status report (BSR) configured to indicate that the apparatus has data to transmit to the AP; and Output for transmission to the AP an indication of a traffic profile of the apparatus. For example, as shown in the second block 804, the third block 806, and the seventh block 814 of FIG. 8.

In the depicted example, the one or more processors 920 include circuitry configured to implement the code stored in the computer-readable medium/memory 930, including circuitry 922 for obtaining, from an access point (AP), a first advertisement frame comprising information configured to enable the apparatus to associate with the AP for wireless communications via a first channel in a first operating band; for obtaining, from the AP, a second advertisement frame comprising at least one of timing information, a traffic announcement, or an operational parameter; for obtaining, prior to the first advertisement frame, an indication that the AP is within a range enabling wireless communications with the apparatus, wherein outputting the association request frame for transmission to the AP via the first channel is in response to one of: expiration of a duration of time starting upon obtaining the indication, or obtaining the first advertisement frame; for obtaining, from the AP, an indication that the first operating band is unavailable, and an extended channel switch announcement (ECSA) frame advertising that the AP is moving from the first channel in the first operating band to a second channel in a second operating band; and for obtaining a second advertisement frame comprising information configured to enable the apparatus to associate with the AP for wireless communications via a second channel in a second operating band, wherein the second operating band is a 3.5 GHz band. For example, as shown in the first block 802, the fourth block 808, the fifth block 810, the sixth block 812, and the eighth block 816 of FIG. 8.

Various components of communications device 900 may provide means for performing the methods described herein, including with respect to FIG. 8.

In some examples, means for transmitting, outputting, or sending (or means for outputting for transmission) may include the transceivers 254 and/or antenna(s) 252 of the STAs 104*a* and 104*x* illustrated in FIG. 2 and/or transceiver 908 and antenna 910 of the communication device 900 in FIG. 9.

In some examples, means for receiving (or means for obtaining) may include the transceivers 254 and/or antenna(s) 252 of the STAs illustrated in FIG. 2 and/or transceiver 908 and antenna 910 of the communication device 900 in FIG. 9.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for determining, means for obtaining, means for sending, means for refraining from outputting, means for switching, means for setting, and means for selecting, may include various processing system components, such as: the one or more processors 920 in FIG. 9, or aspects of the STAs 104 depicted in FIG. 2, including receive processor 260, transmit processor 290, TX data processor 288, and/or controller 280.

Notably, FIG. 9 is an example, and many other examples and configurations of communication device 900 are possible.

Example Aspects

Example 1: A method for wireless communications at an access point (AP), comprising: generating a first advertisement frame comprising information configured to enable one or more communication devices to associate with the AP for wireless communications via a first channel in a first operating band; and outputting the first advertisement frame for transmission according to a first periodic interval.

Example 2: The method of example 1, wherein the first advertisement frame comprises a beacon frame, and wherein the method further comprises: generating a second advertisement frame comprising at least one of timing information, a traffic announcement, or an operational parameter; and outputting for transmission, via the first channel, the second advertisement frame according to a second periodic interval.

Example 3: The method of example 2, wherein the first periodic interval is greater than the second periodic interval.

Example 4: The method of any of examples 2 and 3, wherein the second advertisement frame comprises at least one of a traffic indication map (TIM) frame, a fast initial link setup (FILS) discovery (FD) frame, or an unsolicited broadcast probe response (UBPR) frame.

Example 5: The method of any of examples 2-4, wherein the second advertisement frame comprises a multi-user (MU) physical layer protocol data unit (PPDU).

Example 6: The method of example 5, wherein the MU PPDU comprises one of: (i) a traffic indication map (TIM) frame and a fast initial link setup (FILS) discovery (FD) frame, or (ii) the TIM frame and an unsolicited broadcast probe response (UBPR) frame.

Example 7: The method of any of examples 5 and 6, wherein the TIM frame is outputted for transmission over a first resource unit (RU), and the FD frame or the UBPR frame is outputted for transmission over a second RU.

Example 8: The method of any of examples 5-7, wherein the second RU is in a primary channel of the first operating band, wherein the first RU is in a secondary channel of the first operating band, and wherein a bandwidth of the first operating band is greater than 20 MHz.

Example 9: The method of any of examples 1-8, wherein the first advertisement frame comprises an element indicating a target wake time (TWT) service period (SP) configured to indicate a time window during which the one or more communication devices can transmit an association request frame via the first channel.

Example 10: The method of any of examples 1-9, wherein the first advertisement frame is outputted for transmission via the first channel, and wherein the first operating band is a 3.5 GHz band.

Example 11: The method of any of examples 1-10, further comprising: obtaining, from a spectrum access system (SAS), an indication that the first operating band is unavailable; and outputting, for transmission to a first communication device of the one or more communication devices via the first channel, an extended channel switch announcement (ECSA) frame advertising that the AP is moving from the first channel in the first operating band to a second channel in a second operating band, wherein the ECSA frame is outputted for transmission in response to the indication that the first operating band is unavailable.

Example 12: The method of any of examples 1-11, wherein the first advertisement frame is outputted for transmission via a second channel in a second operating band.

Example 13: The method of any of examples 1-12, wherein the first advertisement frame comprises a beacon frame or a probe response frame, and wherein the information configured to enable the one or more communication devices to associate with the AP is provided via a reduced neighbor report (RNR) information element (IE).

Example 14: The method of any of examples 1-13, wherein the first advertisement frame comprises information configured to enable the one or more communication devices to associate with the AP for wireless communications via at least one of the first channel in the first operating band or the second channel in the second operating band.

Example 15: The method of any of examples 1-14, wherein the first operating band is a 3.5 GHz band, and wherein the second operating band is a 2.4 GHz band, a 5 GHz band, a 6 GHz band, a 60 GHz band, or a 900 MHz band.

Example 16: The method of any of examples 1-15, wherein the first advertisement frame comprises do not transmit (DNT) information configured to prevent the one or more communication devices from communicating over at least one of the second channel or the second operating band.

Example 17: The method of any of examples 1-16, further comprising: obtaining, from a first communication device of the one or more communication devices, an indication of a traffic profile of the first communication device; and outputting, for transmission to the first communication device via the first channel, a second advertisement frame comprising information configured to enable the first communication device to associate with the AP for wireless communications via a second channel in a second operating band, wherein outputting the second advertisement frame is based on a determination that the traffic profile qualifies the first communication device for wireless communications with the AP via the second operating band, and wherein the second operating band is a 3.5 GHz band.

Example 18: The method of any of examples 1-17, wherein the second advertisement frame comprises a target wake time (TWT) service period (SP) indicating a time for the first communication device to communicate with the AP.

Example 19: A method for wireless communications at a station (STA), comprising: obtaining, from an access point (AP), a first advertisement frame comprising information configured to enable the STA to associate with the AP for wireless communications via a first channel in a first operating band; and outputting an association request frame for transmission to the AP via the first channel.

Example 20: The method of example 19, further comprising outputting, for transmission to the AP, a buffer status report (BSR) configured to indicate that the STA has data to transmit to the AP.

Example 21: The method of example 20, wherein the first advertisement frame comprises a beacon frame, and wherein the method further comprises obtaining, from the AP, a second advertisement frame comprising at least one of timing information, a traffic announcement, or an operational parameter.

Example 22: The method of any of examples 20 and 21, wherein the second advertisement frame comprises at least one of a traffic indication map (TIM) frame, a fast initial link setup (FILS) discovery (FD) frame, or an unsolicited broadcast probe response (UBPR) frame.

Example 23: The method of any of examples 20-22, wherein the TIM frame is obtained over a first resource unit (RU), and the FD frame or the UBPR frame is outputted for transmission over a second RU.

Example 24: The method of any of examples 20-23, wherein the second RU is in a primary channel of the first operating band, wherein the first RU is in a secondary channel of the first operating band, and wherein a bandwidth of the first operating band is greater than 20 MHz.

Example 25: The method of any of examples 20-24, wherein the information configured to enable the STA to associate with the AP is provided in a reduced neighbor report (RNR) information element (IE) obtained via a beacon frame or a probe response frame.

Example 26: The method of any of examples 19-25, wherein the STA is configured with security credentials to enable wireless communications via one or more channels in the first operating band prior to obtaining the first advertisement frame.

Example 27: The method of any of examples 19-26, further comprising: obtaining, prior to the first advertisement frame, an indication that the AP is within a range enabling wireless communications with the STA, wherein outputting the association request frame for transmission to the AP via the first channel is in response to one of: expiration of a duration of time starting upon obtaining the indication, or obtaining the first advertisement frame.

Example 28: The method of any of examples 19-26, further comprising obtaining, from the AP, an indication that the first operating band is unavailable, and an extended channel switch announcement (ECSA) frame advertising that the AP is moving from the first channel in the first operating band to a second channel in a second operating band.

Example 29: The method of any of examples 19-27, wherein the first advertisement frame is outputted for transmission via a second channel in a second operating band, and wherein the first operating band is a 3.5 GHz band, and wherein the second operating band is a 2.4 GHz band, a 5 GHz band, a 6 GHz band, a 60 GHz band, or a 900 MHz band.

Example 30: The method of any of examples 19-29, wherein the first advertisement frame comprises do not transmit (DNT) information configured to prevent the STA from communicating over at least one of the second channel or the second operating band.

Example 31: The method of any of examples 19-30, wherein the association request frame is outputted for transmission via the first channel in response to the DNT information.

Example 32: The method of any of examples 19-31, further comprising: outputting for transmission to the AP an indication of a traffic profile of the STA; and obtaining a second advertisement frame comprising information configured to enable the STA to associate with the AP for wireless communications via a second channel in a second operating band, wherein the second operating band is a 3.5 GHz band.

Example 33: The method of any of examples 19-32, wherein the second advertisement frame comprises a target wake time (TWT) service period (SP) indicating a time for the STA to communicate with the AP.

Example 34: The method of any of examples 19-33, wherein the second advertisement frame further comprises operational parameters associated with the 3.5 GHz band, wherein the operational parameters include at least one of a basic service set (BSS) parameter, an enhanced distributed channel access (EDCA) parameter, a transmit power parameter, a bandwidth parameter, or a puncturing pattern parameter.

Example 35: The method of any of examples 19-34, wherein the transmit power parameter comprises an indication of a maximum transmit power of the STA, wherein the bandwidth parameter comprises an indication of a bandwidth of the second channel, wherein the puncturing pattern parameter comprises an indication of at least one channel within the 3.5 GHz band over which the STA cannot output data for transmission.

Example 36: An apparatus for wireless communications, comprising: a memory comprising instructions; and one or more processors configured to execute the instructions and cause the apparatus to perform a method in accordance with any one of examples 1-18.

Example 37: An apparatus for wireless communications, comprising: a memory comprising instructions; and one or more processors configured to execute the instructions and cause the apparatus to perform a method in accordance with any one of examples 19-35.

Example 38: An access point (AP), comprising: at least one transceiver; a memory comprising instructions; and one or more processors configured to execute the instructions and cause the AP to perform a method in accordance with any one of examples 1-18, wherein the at least one transceiver is configured to transmit the first advertisement frame according to a first periodic interval.

Example 39: A station (STA), comprising: at least one transceiver; a memory comprising instructions; and one or more processors configured to execute the instructions and cause the STA to perform a method in accordance with any one of examples 19-35, wherein the at least one transceiver is configured to: receive, from an access point (AP), a first advertisement frame comprising information configured to enable the STA to associate with the AP for wireless communications via a first channel in a first operating band; and transmit an association request frame to the AP via the first channel.

Example 40: An apparatus for wireless communications, comprising means for performing a method in accordance with any one of examples 1-18.

Example 41: An apparatus for wireless communications, comprising means for performing a method in accordance with any one of examples 19-35.

Example 42: A non-transitory computer-readable medium comprising instructions that, when executed by an apparatus, cause the apparatus to perform a method in accordance with any one of examples 1-18.

Example 43: A non-transitory computer-readable medium comprising instructions that, when executed by an apparatus, cause the apparatus to perform a method in accordance with any one of examples 19-35.

Additional Considerations

The preceding description provides examples of techniques for increasing local area network (LAN) device privacy in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communications, comprising:
   one or more memories comprising instructions; and
   one or more processors configured to execute the instructions and cause the apparatus to:
   generate a first advertisement frame comprising at least one of: (i) information configured to enable one or more communication devices to associate with the apparatus for wireless communications via a first operating band, and (ii) an element indicating a target wake time (TWT) service period (SP) configured to indicate a time window during which the one or more communication devices can transmit an association request frame via the first operating band;
   output the first advertisement frame for transmission according to a first periodic interval, wherein the first advertisement frame is outputted for transmission via a second operating band;
   communicate with the one or more communication devices via the first operating band;
   obtain an indication that the first operating band is unavailable; and
   output, for transmission to a first communication device of the one or more communication devices via the first operating band, an extended channel switch announcement (ECSA) frame advertising that the apparatus is moving from the first operating band to the second operating band, wherein the ECSA frame is outputted for transmission in response to the indication that the first operating band is unavailable.

2. The apparatus of claim 1, wherein the first advertisement frame comprises a beacon frame, and wherein the one or more processors are further configured to cause the apparatus to:
   generate a second advertisement frame comprising at least one of timing information, a traffic announcement, or an operational parameter; and
   output for transmission, via the first operating band, the second advertisement frame according to a second periodic interval.

3. The apparatus of claim 2, wherein the first periodic interval is greater than the second periodic interval.

4. The apparatus of claim 2, wherein the second advertisement frame comprises at least one of a traffic indication map (TIM) frame, a fast initial link setup (FILS) discovery (FD) frame, or an unsolicited broadcast probe response (UBPR) frame.

5. The apparatus of claim 2, wherein the second advertisement frame comprises a multi-user (MU) physical layer protocol data unit (PPDU).

6. The apparatus of claim 5, wherein the MU PPDU comprises one of: (i) a traffic indication map (TIM) frame and a fast initial link setup (FILS) discovery (FD) frame, or (ii) the TIM frame and an unsolicited broadcast probe response (UBPR) frame.

7. The apparatus of claim 6, wherein the TIM frame is outputted for transmission over a first resource unit (RU), and the FD frame or the UBPR frame is outputted for transmission over a second RU.

8. The apparatus of claim 7, wherein the second RU is in a primary channel of the first operating band, wherein the first RU is in a secondary channel of the first operating band, and wherein a bandwidth of the first operating band is greater than 20 MHz.

9. The apparatus of claim 1, wherein the first operating band is a 3.5 GHz band.

10. The apparatus of claim 1, wherein the first advertisement frame comprises a beacon frame or a probe response frame, and wherein the information configured to enable the one or more communication devices to associate with the apparatus is provided via a reduced neighbor report (RNR) information element (IE).

11. The apparatus of claim 1, wherein the first advertisement frame further comprises information configured to enable the one or more communication devices to associate with the apparatus for wireless communications via the second operating band.

12. The apparatus of claim 1, wherein the first operating band is a 3.5 GHz band, and wherein the second operating band is a 2.4 GHz band, a 5 GHz band, a 6 GHz band, a 60 GHz band, or a 900 MHZ band.

13. The apparatus of claim 1, wherein the first advertisement frame comprises do not transmit (DNT) information configured to prevent the one or more communication devices from communicating over the second operating band.

14. The apparatus of claim 1, wherein the one or more processors are further configured to cause the apparatus to:
- obtain, from the first communication device of the one or more communication devices, an indication of a traffic profile of the first communication device; and
- output, for transmission to the first communication device via the first operating band, a second advertisement frame comprising information configured to enable the first communication device to associate with the apparatus for wireless communications via the second operating band, wherein outputting the second advertisement frame is based on a determination that the traffic profile qualifies the first communication device for wireless communications with the apparatus via the second operating band, and wherein the second operating band is a 3.5 GHz band.

15. The apparatus of claim 14, wherein the second advertisement frame comprises the TWT SP indicating a time for the first communication device to communicate with the apparatus.

16. The apparatus of claim 1, wherein:
- at least one of: (i) the information is configured to enable the one or more communication devices to associate with the apparatus via a first channel in the first operating band, and (ii) the element indicating the TWT SP is configured to indicate the time window during which the one or more communication devices can transmit the association request frame via the first channel,
- the first advertisement frame is outputted for transmission via a second channel in the second operating band,
- the communication with the one or more communication devices is performed via the first channel in the first operating band, and
- the first operating band is a same operating band as the second operating band.

17. An apparatus for wireless communications, comprising:
- one or more memories comprising instructions; and
- one or more processors configured to execute the instructions and cause the apparatus to:
  - obtain, from an access point (AP) via a second operating band, a first advertisement frame comprising at least one of: (i) information configured to enable the apparatus to associate with the AP for wireless communications via a first operating band, and (ii) an element indicating a target wake time (TWT) service period (SP) configured to indicate a time window during which the apparatus can transmit an association request frame via the first operating band;
  - output the association request frame for transmission to the AP via the first operating band; and
  - obtain, from the AP, an indication that the first operating band is unavailable, and an extended channel switch announcement (ECSA) frame advertising that the AP is moving from the first operating band to the second operating band.

18. The apparatus of claim 17, wherein the one or more processors are further configured to cause the apparatus to output, for transmission to the AP, a buffer status report (BSR) configured to indicate that the apparatus has data to transmit to the AP.

19. The apparatus of claim 17, wherein the first advertisement frame comprises a beacon frame, and wherein the one or more processors are further configured to cause the apparatus to obtain, from the AP, a second advertisement frame comprising at least one of timing information, a traffic announcement, or an operational parameter.

20. The apparatus of claim 19, wherein the second advertisement frame comprises at least one of a traffic indication map (TIM) frame, a fast initial link setup (FILS) discovery (FD) frame, or an unsolicited broadcast probe response (UBPR) frame.

21. The apparatus of claim 20, wherein the TIM frame is obtained over a first resource unit (RU), and the FD frame or the UBPR frame is outputted for transmission over a second RU.

22. The apparatus of claim 21, wherein the second RU is in a primary channel of the first operating band, wherein the first RU is in a secondary channel of the first operating band, and wherein a bandwidth of the first operating band is greater than 20 MHz.

23. The apparatus of claim 17, wherein the information configured to enable the apparatus to associate with the AP is provided in a reduced neighbor report (RNR) information element (IE) obtained via a beacon frame or a probe response frame.

24. The apparatus of claim 17, wherein the apparatus is configured with security credentials to enable wireless communications via one or more channels in the first operating band prior to obtaining the first advertisement frame.

25. The apparatus of claim 17, wherein the one or more processors are further configured to cause the apparatus to:
- obtain, prior to the first advertisement frame, an indication that the AP is within a range enabling wireless communications with the apparatus, wherein outputting the association request frame for transmission to the AP via the first operating band is in response to one of: expiration of a duration of time starting upon obtaining the indication, or obtaining the first advertisement frame.

26. The apparatus of claim 17, wherein the first operating band is a 3.5 GHz band, and wherein the second operating band is a 2.4 GHz band, a 5 GHz band, a 6 GHz band, a 60 GHz band, or a 900 MHz band.

27. The apparatus of claim 17, wherein the first advertisement frame comprises do not transmit (DNT) information configured to prevent the apparatus from communicating over the second operating band.

28. The apparatus of claim 27, wherein the association request frame is outputted for transmission via the first operating band in response to the DNT information.

29. The apparatus of claim 17, wherein the one or more processors are further configured to cause the apparatus to:
- output for transmission to the AP an indication of a traffic profile of the apparatus; and
- obtain a second advertisement frame comprising information configured to enable the apparatus to associate with the AP for wireless communications via the second operating band, wherein the second operating band is a 3.5 GHz band.

30. The apparatus of claim 29, wherein the second advertisement frame comprises a TWT SP indicating a time for the apparatus to communicate with the AP.

31. The apparatus of claim 29, wherein the second advertisement frame further comprises operational parameters associated with the 3.5 GHz band, wherein the operational parameters include at least one of a basic service set (BSS) parameter, an enhanced distributed channel access (EDCA) parameter, a transmit power parameter, a bandwidth parameter, or a puncturing pattern parameter.

32. The apparatus of claim 31, wherein the transmit power parameter comprises an indication of a maximum transmit power of the apparatus, wherein the bandwidth parameter comprises an indication of a bandwidth of a channel within the second operating band, wherein the puncturing pattern parameter comprises an indication of at least one channel within the 3.5 GHz band over which the apparatus cannot output data for transmission.

33. The apparatus of claim 17, wherein:
the first advertisement frame is obtained via a second channel in the second operating band,
at least one of: (i) the information is configured to enable the apparatus to associate with the AP via a first channel in the first operating band, and (ii) the element indicating the TWT SP is configured to indicate the time window during which the apparatus can transmit the association request frame via the first channel,
the association request frame is outputted for transmission via the first channel, and
the first operating band is a same operating band as the second operating band.

34. A method for wireless communications at a station (STA), comprising:
obtaining, from an access point (AP) via a second operating band, a first advertisement frame comprising at least one of: (i) information configured to enable the STA to associate with the AP for wireless communications via a first operating band, and (ii) an element indicating a target wake time (TWT) service period (SP) configured to indicate a time window during which the STA can transmit an association request frame via the first operating band;
outputting the association request frame for transmission to the AP via the first operating band; and
obtaining, from the AP, an indication that the first operating band is unavailable, and an extended channel switch announcement (ECSA) frame advertising that the AP is moving from the first operating band to the second operating band.

* * * * *